(12) United States Patent
Czarno

(10) Patent No.: US 7,891,393 B1
(45) Date of Patent: Feb. 22, 2011

(54) WHEEL SYSTEM INCLUDING AUTOMATIC TIRE REPAIR

(76) Inventor: Yanush Edward Czarno, P.O. Box 2064, Miami Beach, FL (US) 33140

( * ) Notice: Subject to any disclaimer, the term of this patent is extended or adjusted under 35 U.S.C. 154(b) by 947 days.

(21) Appl. No.: 10/363,418

(22) PCT Filed: Oct. 21, 2000

(86) PCT No.: PCT/US00/29154

§ 371 (c)(1),
(2), (4) Date: Mar. 3, 2003

(87) PCT Pub. No.: WO01/28787

PCT Pub. Date: Apr. 26, 2001

(51) Int. Cl.
*B60C 5/00* (2006.01)
*B29C 73/16* (2006.01)

(52) U.S. Cl. .............. 152/339.1; 152/503; 152/521; 152/379.3

(58) Field of Classification Search ............. 152/339.1, 152/340.1, 502–503, 516, 518–519, 379.3–379.4, 152/381.3–381.4, 381.6
See application file for complete search history.

(56) References Cited

U.S. PATENT DOCUMENTS

| | | | | |
|---|---|---|---|---|
| 1,041,739 A | * | 10/1912 | Chipley | 152/339.1 |
| 1,064,611 A | * | 6/1913 | Chipley | 152/339.1 |
| 1,354,984 A | | 10/1920 | McCaffrey | |
| 1,622,332 A | | 3/1927 | Marrazzo | |
| 2,554,815 A | | 5/1951 | Church | |
| 2,618,308 A | * | 11/1952 | Khalil | 152/339.1 |
| 2,925,845 A | * | 2/1960 | Merz et al. | 152/339.1 |
| 2,990,869 A | * | 7/1961 | Riley | 152/339.1 |
| 3,161,219 A | * | 12/1964 | Danhi | 152/339.1 |
| 3,294,142 A | * | 12/1966 | Robertson | 152/339.1 |
| 3,616,831 A | | 11/1971 | LaFuente et al. | |
| 3,791,432 A | * | 2/1974 | Calullerovich | 152/339.1 |
| 3,910,334 A | * | 10/1975 | Gardner | 152/503 |
| 3,942,572 A | | 3/1976 | Crandall | |
| 4,078,597 A | | 3/1978 | Noda | |
| 4,169,497 A | * | 10/1979 | Tsuruta | 152/418 |
| 4,237,952 A | | 12/1980 | Chautard et al. | |
| 4,930,558 A | * | 6/1990 | Sahagian | 152/339.1 |
| 5,568,830 A | * | 10/1996 | Polsinelli et al. | 152/404 |
| 6,470,935 B1 | * | 10/2002 | Fulsang | 152/339.1 |
| 6,500,286 B1 | * | 12/2002 | Ishikawa et al. | 156/115 |
| 6,786,990 B1 | * | 9/2004 | Yamagiwa | 156/115 |

FOREIGN PATENT DOCUMENTS

| | | |
|---|---|---|
| FR | 635289 | 3/1978 |
| FR | 635355 | 5/1978 |

\* cited by examiner

*Primary Examiner*—Jason R Bellinger
(74) *Attorney, Agent, or Firm*—Melvin K. Silverman

(57) ABSTRACT

An automobile tire having fluid-tight internal partitions to form discrete internal compartments includes bead-like sub-structures provided within internal partitions having contact with a road during use of the tire, the bead sub-structures including a pressure-sensitive sealant in which a rapid change in air pressure in the tire induces activation of the sealant; and a tire wheel having a lateral surface complemental to an inner radial geometry of the tire, including, at an interface between the wheel and the tire, a pump for selectable inflation of at least one of the compartments. The system may also include inflatable wheel sealing ridges formed integrally within the tire, the ridges including circumferential annular fluid tight channels inflatable independently of inflation of the internal wheel partitions.

7 Claims, 27 Drawing Sheets

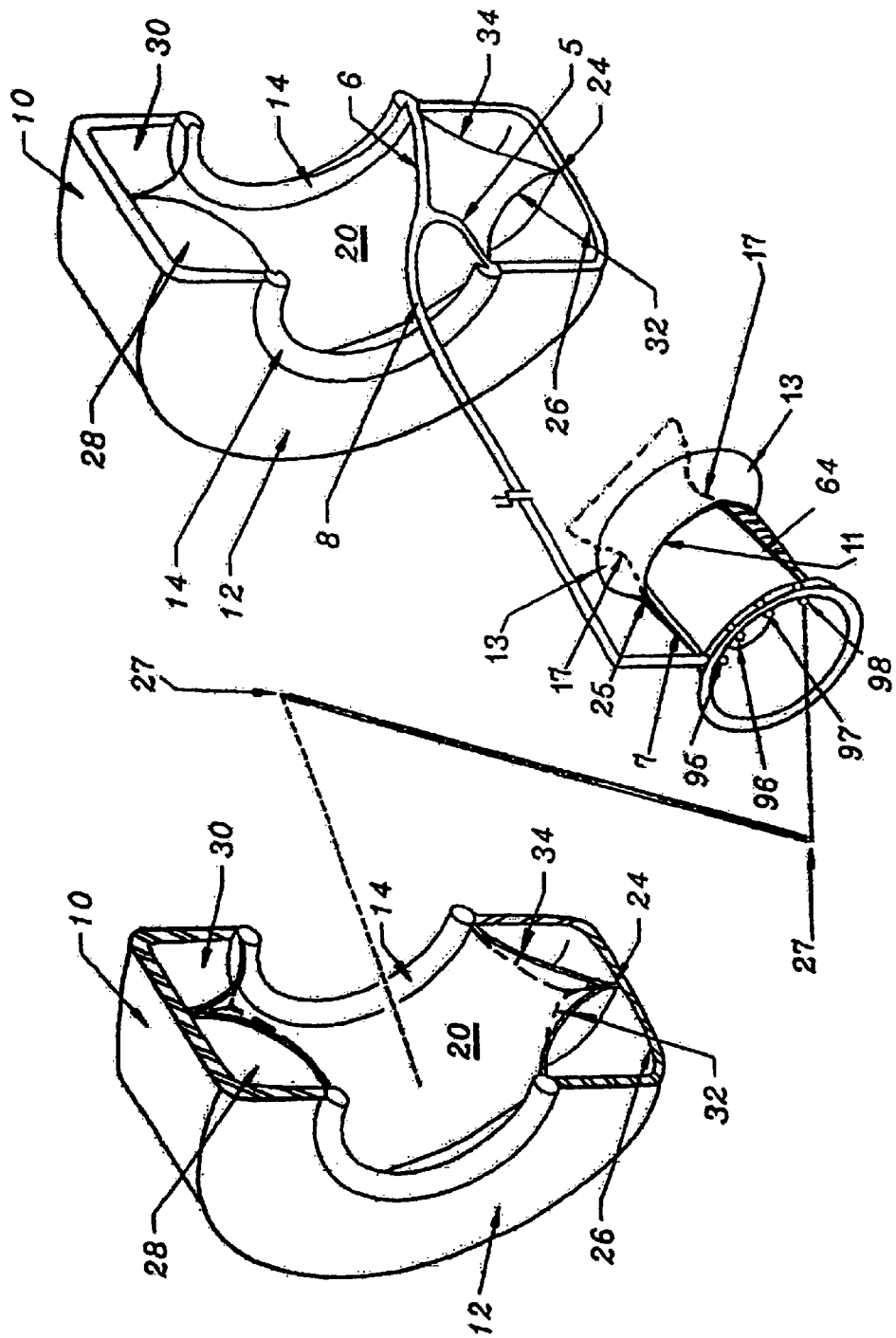

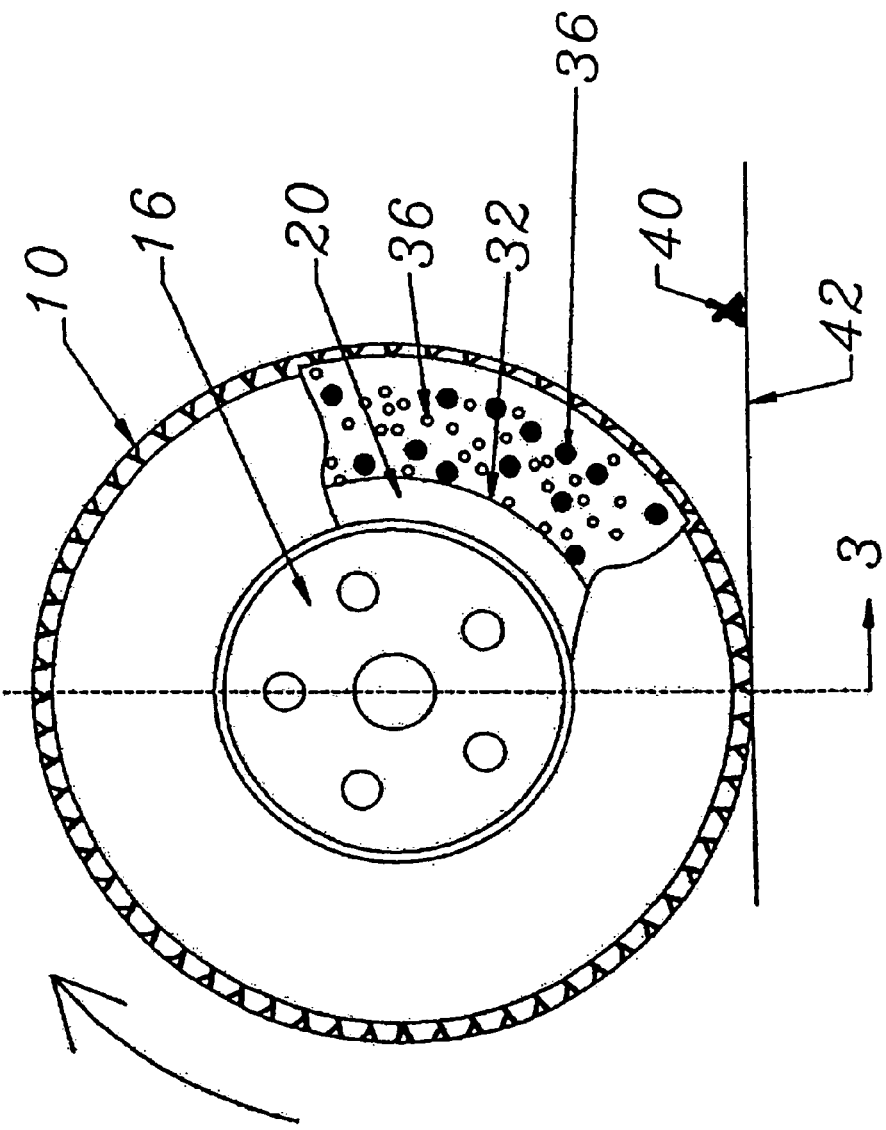

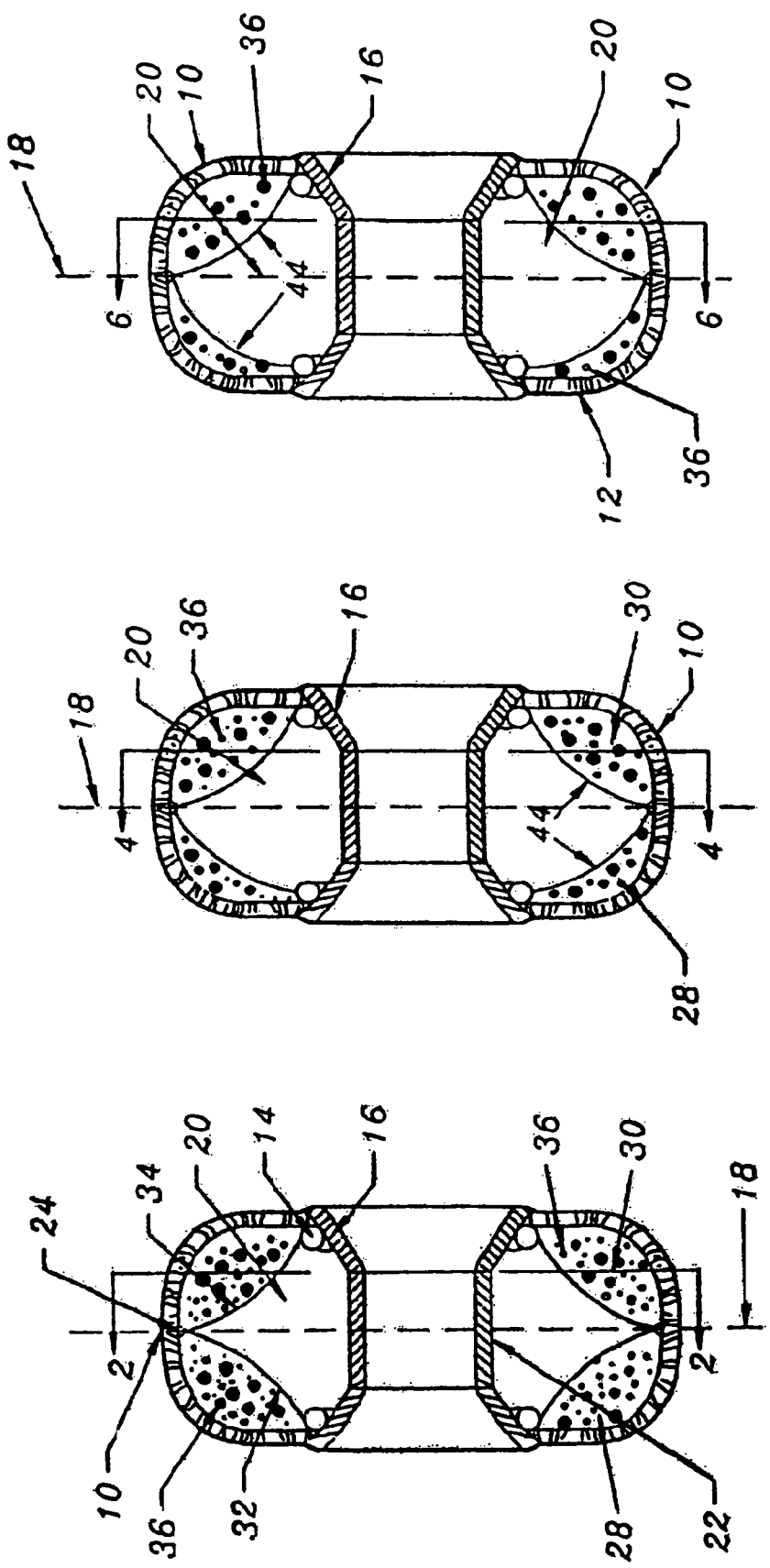

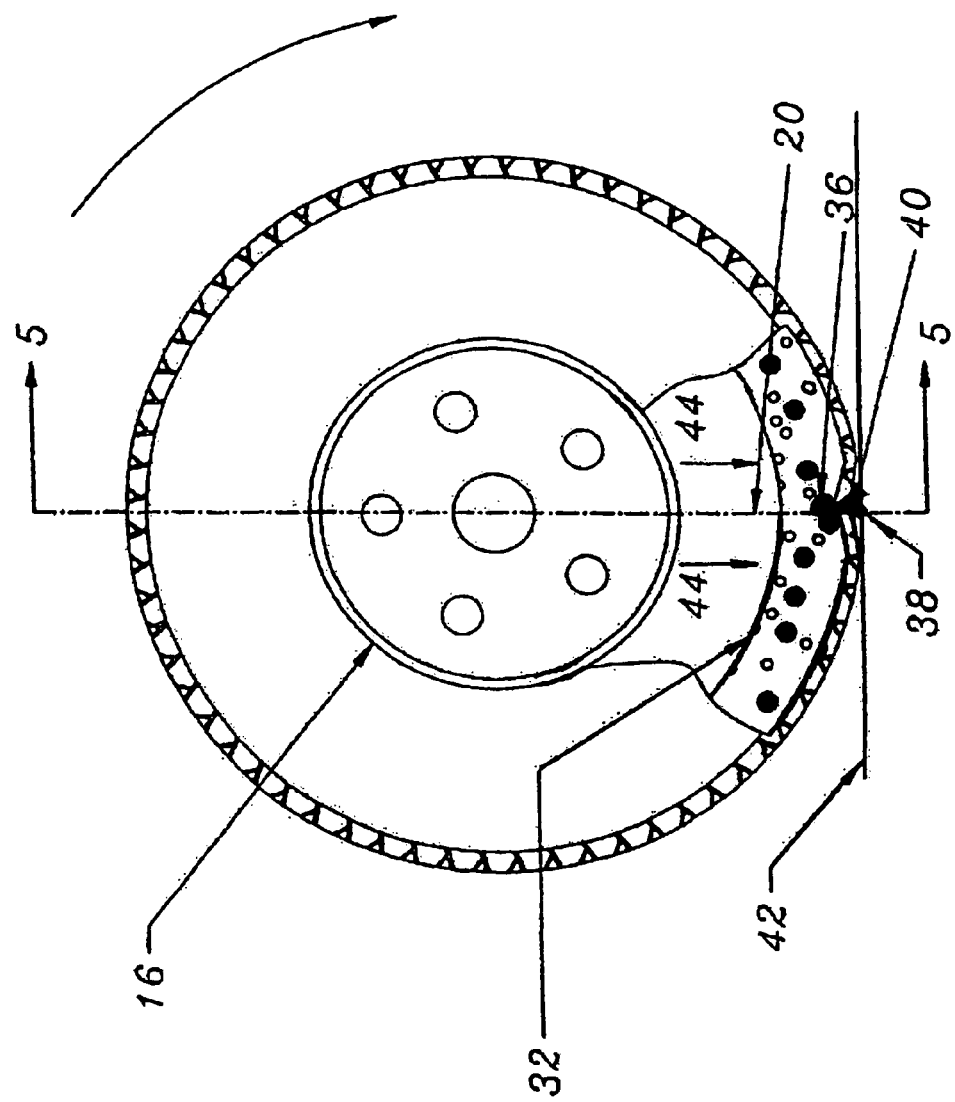

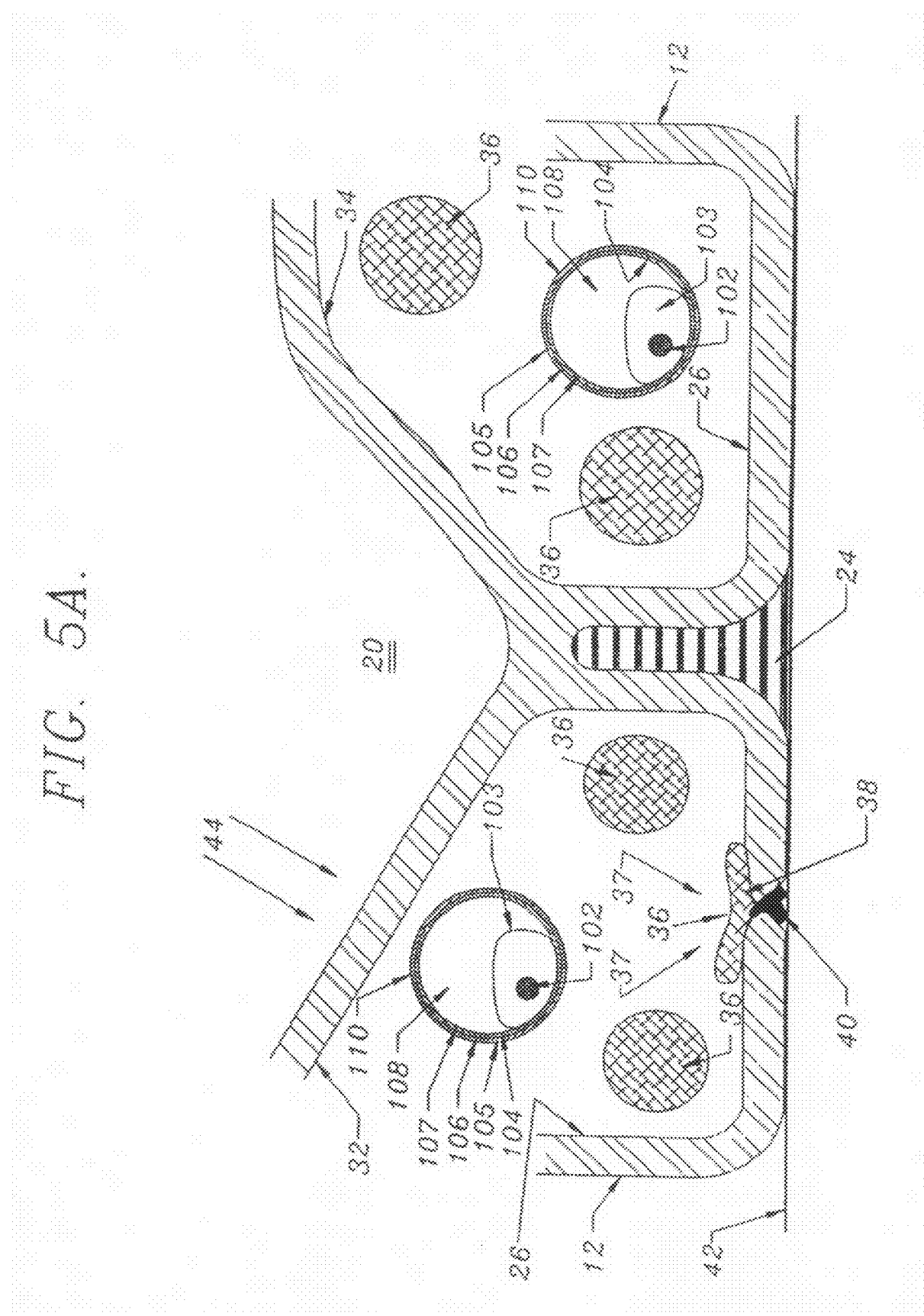

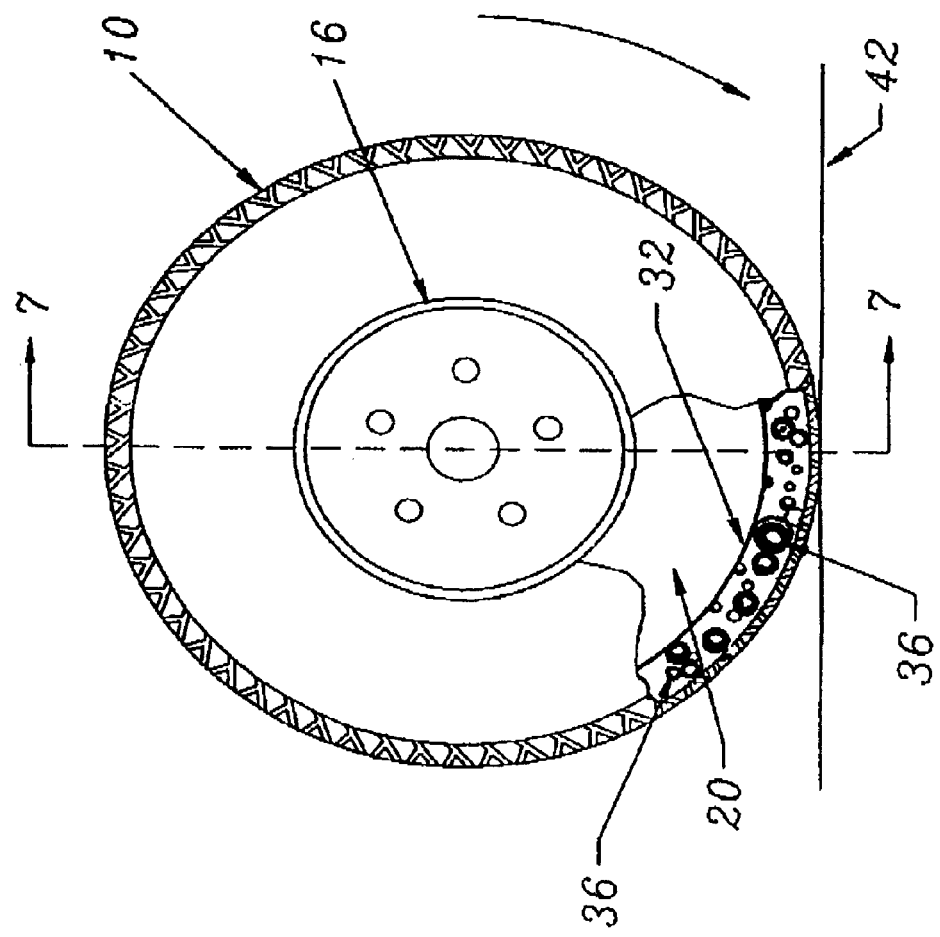

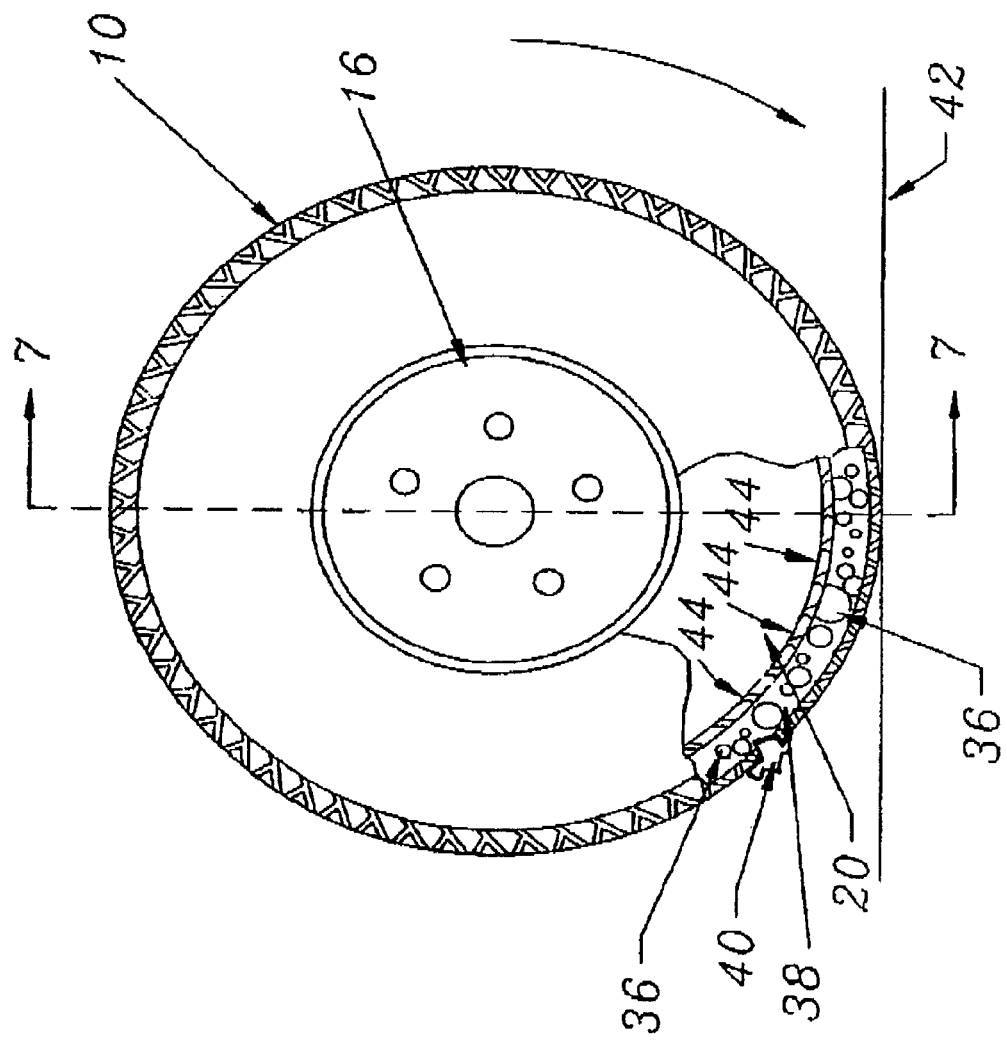

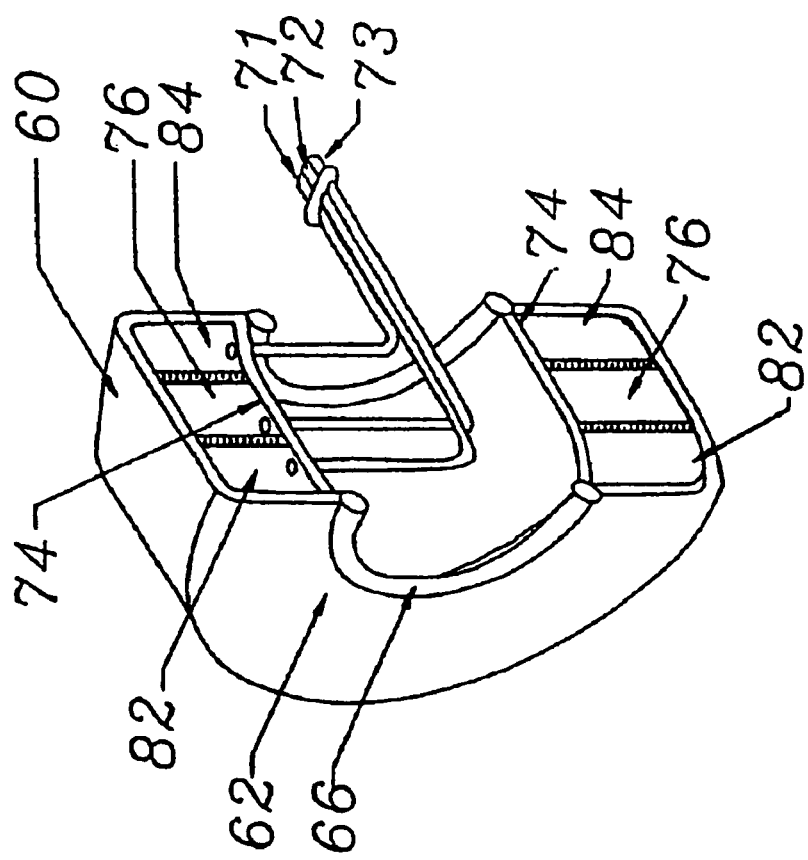
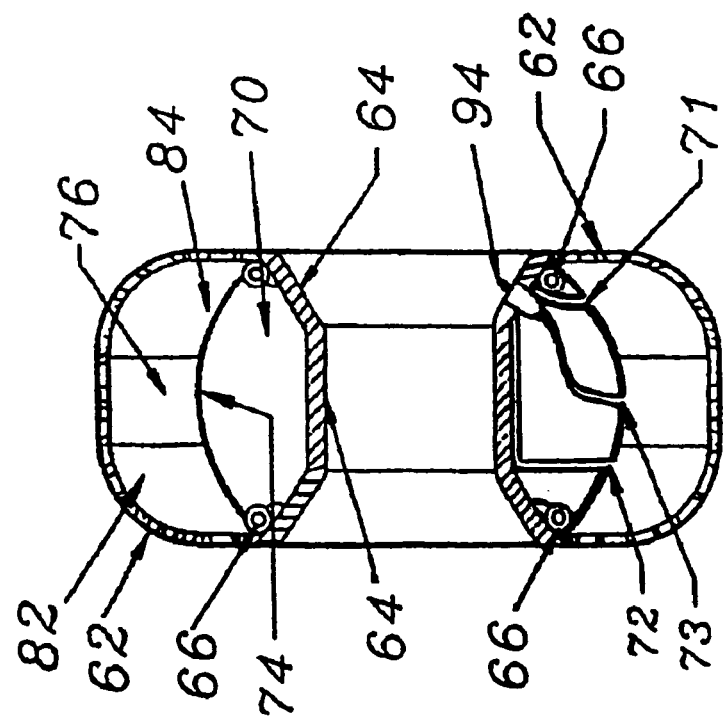

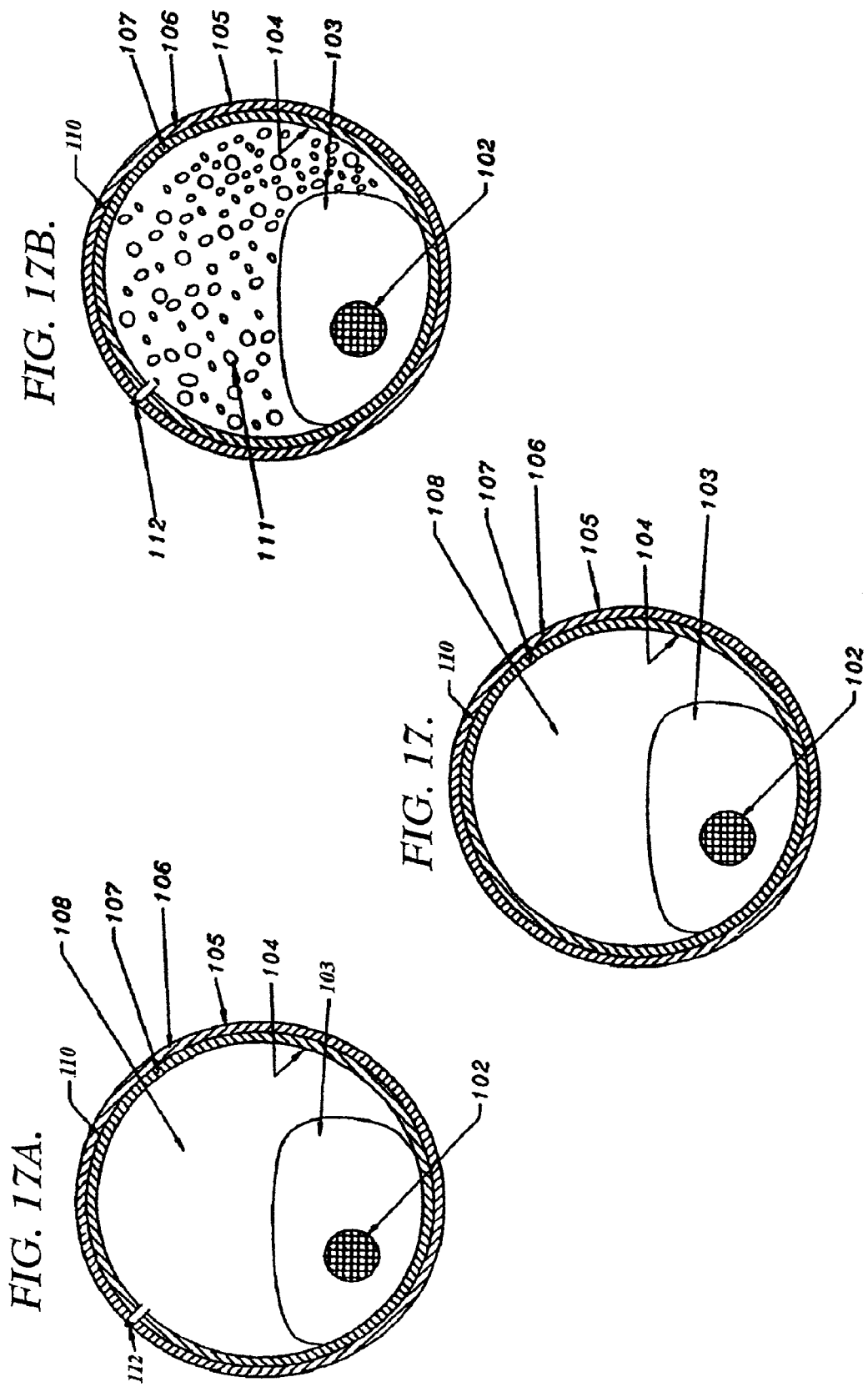

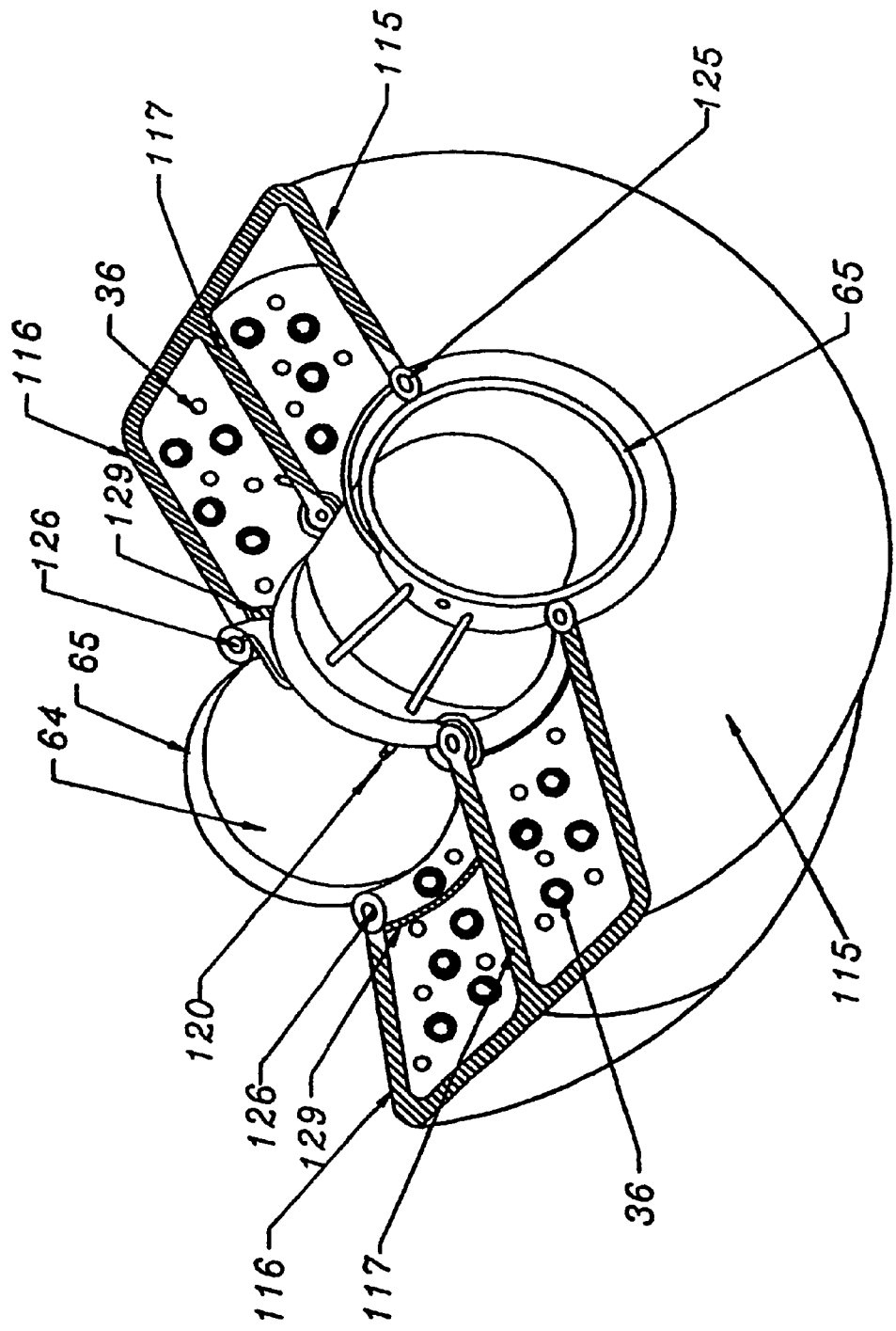

WHEEL SYSTEM INCLUDING AUTOMATIC TIRE REPAIR

CROSS REFERENCES TO RELATED APPLICATIONS

This application claims the benefit of PCT International Publication No. WO 01/28787 A1, published 26 Apr. 2001.

BACKGROUND OF THE INVENTION

1. Area of Invention

The invention relates to systems of self-repair of auto tires.

2. Description of Related Art

Relevant to the present invention are U.S. Pat. No. 4,078,597 to Noda 1978 entitled Tire and Wheel Assemblies. This invention includes an inflatable tubular ring, which is substantially flexible, and lodged in the rim well and when inflated acts as a bed locking, ring.

Multi-compartment tires are known in the art as is shown by U.S. Pat. No. 1,354,984 (1920), to T. J. McCaffrey; U.S. Pat. No. 2,196,814 (1940) to McClay, and showing a multiple chamber or compartment tire structures, provided with some structural points of reinforcement; U.S. Pat. No. 3,616,831 to LaFuento; French Patent No. 635,355 (1928) to Costa; and French Patent No. 1,015,528 (1952) to M. Di Pasquale. The present invention employs a T-joint within integral partitions within a circumferential tire surface contacting the ground. This provides for joint distribution of road pressures to all partitions with the inner structure of the tire, and prevents further rupture by an external object from responsible for an initial rupture. Other relevant patents include U.S. Pat. No. 4,237,952 to Chutard, Pneumatic Tire with Sealing Lining Comprising Thermosetting Resin and Isolated Resin Cross Linking Agents which teaches tire repair with epoxy resin for long term tire repair.

The present invention employs epoxies, resins and hardeners, encapsulating the epoxy in balls of approximately one-half to 2 inches in diameter and up to tennis ball size for larger tires. The round shaped balls include internal flexible thin elastic membranes enabling tire repair to be effected with high air pressure from a portable air pump or an air source.

The present invention responds to the long felt need in the art for a practical system for a self-repair of auto tires that have been ruptured during on-road use.

SUMMARY OF THE INVENTION

The invention relates to a system for self-repair of a tire comprising an automobile tire having fluid-tight internal partitions to form discrete internal compartments therein; bead-like sub-structures provided within said internal partitions having contact with a road during use of the tire, said bead sub-structures including a pressure-sensitive sealant in which a rapid change in air pressure in the tire induces activation of said sealant; and a tire hub having a lateral surface complemental to an inner radial geometry of said tire, including, at an interface between said hub and said tire means for selectable inflation of at least one of said compartments. The system may also include inflatable hub sealing ridges formed integrally within said tire, said hub sealing ridges comprising circumferential annular fluid tight channels inflatable independently of inflation of said internal wheel partitions.

After a certain air reduction and some weight shifting to other tire compartments, a rupture is sealed by said automatic tire repair system which at least slows down the deflation of the rupture. This is achieved by a dynamic resilient round spongy sealing bead sub-structures by the effect of an air pressure gradient from said partitions to the atmosphere. Also provided is a flat tire compartment bypassing capability, so the ruptured compartment, after some air reduction, will remain resilient and the tire, after a weight shifting, will remain steady and operative notwithstanding rupture of the exterior wall thereof.

The objects of the present invention are:

(1) To provide a self-sustained wheel system having a removable radial steel belted, stretchable inflatable wheel flanges or flanges composed of a steel belted solid hard robber made for easy do-it yourself tire mounting and dismounting, especially for a multi-compartment tire which is harder to mount or dismount, thereby making the multi-compartment tire useful and easy to repair from its interior.

(2) To provide a dynamically flexible rupture-withstanding joint multi-compartment tire and multi-surface of diameter automotive tire system with tread design with three distinct patterns and complementary proportional inflation pressures in the said compartments for all season standout. The said tire having enhanced safety so a flat thereof will be, effectively dealt with by shifting the weight on the tire to the additional tire joint compartments.

(3) To provide a tire repair system which in general during and after rupture will remain operative and notwithstanding also rupture of the exterior tire wall thereof.

(4) To provide a tire for a wheel easy assembly changeable with a spare tire at a selected time or in the nearest garage automatically comfortably and professionally, at the same time the rupture can be repaired by a professionally preferred methods and tooling.

(5) To provide an enhanced safety, integrated joint superstructure tire.

(6) To provide a wheel compartment integrated tire superstructures which externally and optionally includes substantially integrated tire walls, forming triple or double tire for mounting on integrated triple or double axle wheel, to withstand several ruptures and instant automatic tire repair therefore, such as to prolong the functionality and performance in avoiding as long as possible the need for a spare tire, and for increasing mobility on hazardous roads.

(7) To provide a flat withstanding joint tire system by, a joint insert which is a multi-compartment tire joint structural combination for any wheel, and for any, externally, combinable, tire structure.

(8) To provide a tire and a wheel system especially for the front wheels of military vehicles, buses, trailers and trucks.

(9) To provide integrated rupture withstanding joint spare tire compartments affecting internal automatic tire repair because the tire structure after rupture will not collapse on the road. Therefore, the automatic tire repair system can be especially effective, also the sharp obstacle if remaining in the rupture could be removed and the internal automatic tire repair can take effect with high air pressure from a portable air pump or air source and with external sharp stick to puncture manually the automatic tire repair element membranes which are, folding within adhesive that is spread and mixed on the rupture therefore, resultantly, bonding, and repairing, the tire.

(10) To provide inflatable tire beds by integral sealing radial inflatable tubes forming wheel sealing ridges for especially easy safe tire mounting and smooth demounting.

The above and yet other objects and advantages of the present invention will become clear and comprehensible from the herein after described Brief Description of the Drawings, Detailed Description of the Invention and Claims appended herewith.

BRIEF DESCRIPTION OF THE DRAWINGS

FIG. 1 is a radial cross-section of the inventive tire, including the wheel thereof showing, in breakaway view, the sealing bead substructures of the system.

FIG. 1A is an exploded view showing the relationship between the tire and its internal compartments, on the one hand, and the tire hub of the invention on the other.

FIG. 2 is a radial cross-section of the inventive tire, including the hub thereof showing, in breakaway view, the sealing bead substructures of the system.

FIG. 3 is a vertical diametric view taken along Line3-3 of FIG. 2.

FIG. 4 is a view, sequential to that of FIG. 2, showing the effect of said sealing substructures on impact of the tire with an external object on the road.

FIG. 5 is a vertical diametric view taken along Line 5-5 of FIG. 4.

FIG. 5A is a conceptual view of the lowermost portion of FIG. 5 showing, in concept, the function of the self-sealing bead substructures in response to a rupture of the tire.

FIG. 6 is a view sequential of that of FIG. 4A and also a diametric view taken through Line 6-6 of FIG. 7.

FIG. 6A is a radial cross-sectional, partial breakaway view sequential to the view of FIG. 6.

FIG. 13 is a view, similar to that of FIG. 12, however showing a different configuration of internal partitions.

FIG. 14 is a perspective view of a wheel structure in accordance with the embodiments of FIGS. 8-15.

FIGS. 17, 17A and 17B are conceptual views of different embodiments of the self-sealing substructures employed within the tire partitions.

FIG. 18A, is a further view of the structure of FIG. 18 showing the self-sealing substructures therein.

DETAILED DESCRIPTION OF THE INVENTION

Figure 4A:
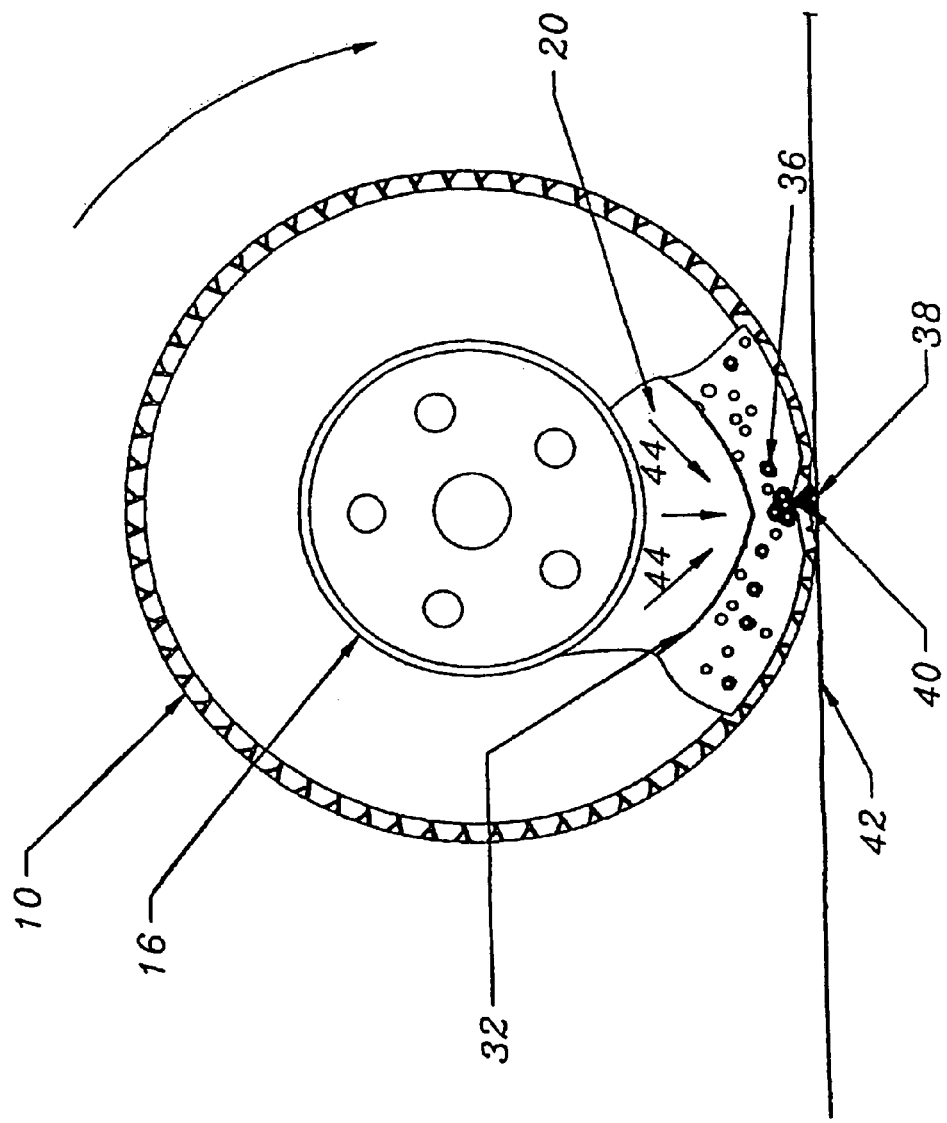
FIG. 4A is a view further sequential to that of FIG. 4.

The wheel system includes a wheel or rim having inflatable shoulders for ease of mounting and dismounting of most sizes of tires. Built, also, for the purpose of handling a flat tire when driving. Inflatable wheel or rim shoulders also function after a flat has occurred, so the vehicle's wheel will remain operative.

A tire of a bicycle can be removed simply from a rim that is basically a C-clamp in cross-section. A C-clamp can include a flange-belt for mounting/dismounting by first pulling of the bicycle tire in a circumferential direction and then pulling 90 degrees to the side. The tire us readily removed by using appropriate pressure in one radial direction and an appropriate twist of 90 degrees to the side. If the 90 degrees or other side pressure is used randomly on the bicycle tire side portion or side wall, the tire will not come off the bicycle rim. However, if one way insert, a radial hard rubber solid belt, or a radial hard rubber steel-belted solid tube, inside the said bicycle tire, at one side of the bicycle wall already mounted on the bicycle rim, or a suitable C-clamp ring. After completing the mounting of the bicycle tire, one can stretch mainly in the direction of the inner internal circumferential diameter of the bicycle tire, when pressed evenly from the side. Because of an external structural system of limited flexibility, one must employ hook-clamp shaped groove, a C-clamp rim, or an appropriate bicycle rim. Said solid hard rubber flange belt of a bicycle tire structure forms a structural system. Mounted as a flange or flanges on said groove or grooves is a C-clamp shape or a circumferential torodial clamp within an automotive wheel rim, optionally made for a wheel of low air pressure, and built according to requirements. Most rims of vehicle wheels bend the metallic shoulders or wheel flanges after a flat occurs. To address this problem, when the wheel rim has inflatable flanges which are strong enough to withstand the road pressure after a flat tire has occurred.

Rubber tires are fitted and welded on a cylindrical wheel-rim having the same diameter as the bicycle rim, to form two or double inflatable wheel-rims having the same diameter to form two double inflatable wheel-rim shoulders or flanges for mounting and dismounting automotive tires. The invention includes an inflatable sealing tube, extending the diameter of the conventional metal practical wheel-rim flange for safety purposes. Wheel sizes and the sizes of the interior proportions of a tire insert for tires include air pressure relative to wheel organizations of available sizes. The wheel proportional structures are diverse and accordingly are correlated to rupture handling wheel structures shown in the drawings and to general road handling and all season braking and traction.

Furthermore, an inflatable when compartment assembly of integrated tire structure, combining an automatic tire repair, with a joint tire structure. Alternatively, with a multi-compartment automotive tire (mostly, practical by external modern approach to tire repair). Generally any joint, compartment number, in various kinds of tires, or within integrated, triple and double tire structures, for mounting upon an axle wheel-rim or integrated triple or double axle wheel rim duplicating the same principles as shown in reference to tire mounting on one axle wheel-rim. The inventive tire extends into contact with the wheel-rim in the tire wall circumferential surface which includes integral, inflatable wheel-rim surrounding radial tubes which form polar wheel-rim sealing ridges along a line defined by contact between said sealing ridges, internal circumferential surface and said wheel-rim surface about the axis of said wheel-rim. The inventive tire further includes an interior bladder, which may use tire tubing extending completely about said wheel-rim, having an inner surface thereof defined by said lateral surface of said wheel-rim and, at its axial extent, comprising said polar wheel rim sealing inflatable tire "beads." The self-repair tire further includes axially opposing outer bladders. Define by the interior volume, not occupied by said interior bladder and each of said opposing outer bladders having a common joint wall with said interior bladder. Resultant reduction in air pressure in any one of said bladders will permit limited joint corresponding expansion of the outer bladders of the system into a limited part of the volume occupied by such one bladder. And therefore also shifting the weight to the most air pressurized compartment. Within each of said compartments, may be provided spongy resilient dynamic tire sealing round ball super-structures, non-adhesive externally and immiscible relative to the interior surface material of said tire. For the effect to enter any rupture or breach in the surface of said tire to repair, thereby. Or, al leas seal the rupture through the effect of air pressure gradient from the ruptured bladder to the atmosphere. Said exiting air pressure is affected; also, through air pressure compressible interior bladder limited T-joint expansion into a ruptured bladder, in reference to air pressure and vacuum principles.

FIGS. 1 to 10 show optional provision of tire tubing in the central compartment having safety joint there is shown an internal perspective views showing the automatic tire repair properties and the safety joint compartment shape of the tire which is joint bladder or an insert which is forming inventive multi-compartment automotive tire super structure for joint rupture withstanding safety response. The inventive automatic tire repair or self-bonding repair within safety joint tire structure includes a circumferential surface 10 which extends symmetrically to define sidewalls which further extend to circumferential optionally air pressure inflatable and table tire beds forming sealing ridges 14. Particularly for easy access to the tire interior structure or the tire interior insert structure after a rupture. In FIG. 1A unfolding from the tire beds to touch and to seal the wheel. Air channels 5 and 6 drive air to wheel sealing ridges 14 through connecting channel 8 which extend to valve 95 on wheel 64. As shown in schematic FIG. 3, said optionally inflatable wheel-sealing ridges 14 define a circular line of contact with wheel 16 about the axis of the wheel and a plane of symmetry 18 (see dotted vertical line in FIG. 3). As may be further noted in FIGS. 1 to 10, an interior bladder 20 extends completely about wheel 16. Also, can be pressurized with a tire tube. Thereby, the inner surface of bladder 20 is defined by a lateral surface 22 of wheel 16, see FIG. 3 and, at its circumferential radial extent, is defined by central wall portion joint partition 24 and the circumferential line 24 in integral joint co-extensively with a tire central interior surface 26. At its axial extent it is defined by said air pressure inflatable and -table tire bed forming wheel sealing ridges 14 that are structured to unfold through air pressure principles to the direction of their internal diameters unfolding from the tire to touch and pressure grip the external wheel structure by reduction of their internal diameter.

FIG. 2 is a cross sectional, wheel integrated tire view, of a dynamic schematic perspective view of an outer compartment of FIG. 1. Before the occurrence of the puncture or rupture, and also a partial internal cutaway perspective view of the central backing interior compartment of the embodiment of FIG. 1, in which a spongy resilient dynamic sealing automatic tire repair substructures are substantially, externally "non-adhesive" and externally immiscible, in relation to the tire interior surface. The dynamic immiscible substructures have been added ad shown in the outer compartments backed up by the inner central compartment shown in FIG. 1.

FIG. 4 is an automotive wheel general schematic internal perspective view. Moreover, an automatic sealing, dynamic perspective view. Shown from FIGS. 4 to 5A otherwise similar to the view of FIG. 2, showing the occurrence of a rupture of the circumferential tire surface, corresponding to the interior bladder expansion and weight shifting, dynamically keeping the resilience of the rupture compartment and backing the automatic sealing. Also, showing in general reference from FIGS. 4 to 5A, the dynamic transition of the sealing materials, to the rupture, and the correlation of the occurrence that begins a sealing automatically, on the rupture. Such that further automatic tire repair will take effect in the second in order of occurrence, taking effect, according to the kind of rupture and obstacle size. In general, if the obstacle is stuck in the rupture, the probability is that the rupture may be compressed or sealed by the sealing material or thereafter, if not sealed, by-passed with the joint interior bladder wall. If the obstacle is not stuck in the tire rupture, the probability is that the puncture or rupture, will be sealed by the dynamic substructures, for the effect of the automatic tire repair to take place in the next stage in order.

FIG. 4A is an internal wheel perspective of a dynamic schematic view, of the area of the tire puncture and rupture explained, and shown, in FIG. 4. Corresponding to further possible interior bladder, expansion and further weight shifting. Keeping pressure in backing the automatic sealing, and the resilience of the rupture compartment. But reducing pressure on the obstacle and the rupture area. Also, showing the dynamic transition of the sealing material to the rupture area. And, the instant correlation further comprising the occurrence of a sealing automatically on the rupture, which has very good probability to take effect according to the kind and size of the rupture and the obstacle and if is stuck in the rupture as explained in FIG. 4.

Figure 4B:
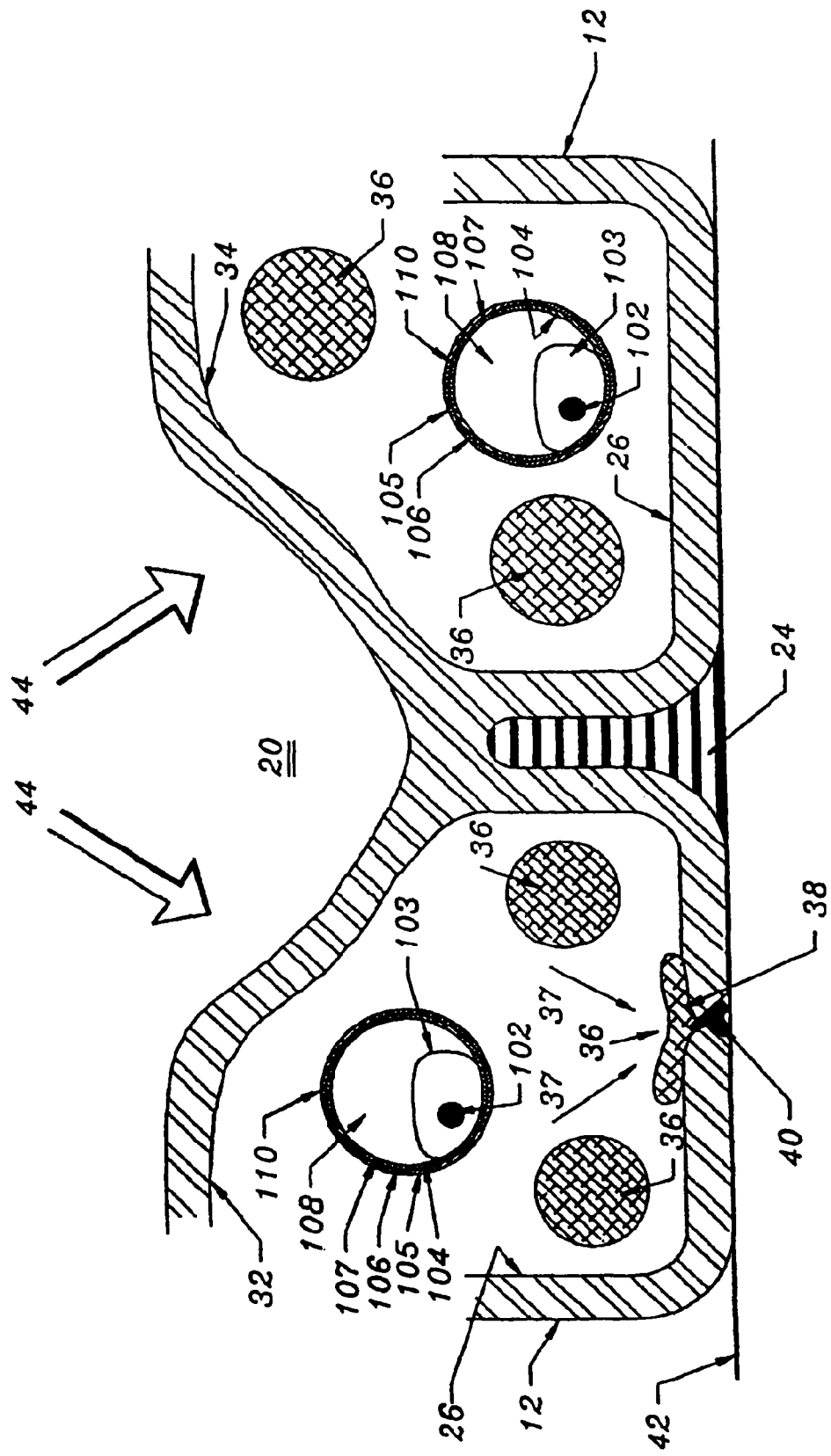
FIG. 4B is a principle, dynamic partial, cross sectional view of FIG. 4.
Figure 9:
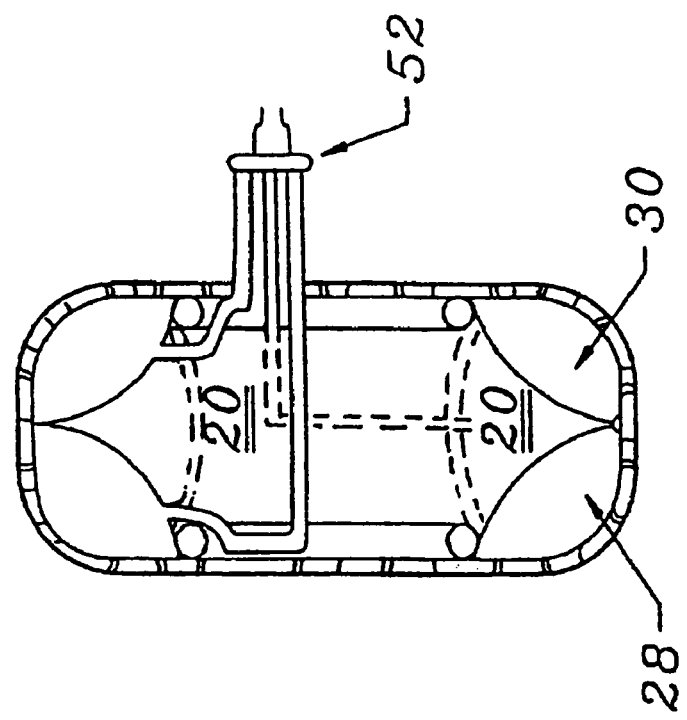
FIG. 9 is an axial, diametric cross-sectional breakaway view of the embodiment of FIG. 9.

FIG. 4B is a principle, dynamic partial, cross sectional view of FIG. 4. With the tire sealing and bonding light substructures showing along the arrows, the transition of the tire repair substructures to the puncture or rupture areas, and showing the instant automatic sealing, on the rupture area for the automatic tire repair further in time occurrence, which takes effect after several minutes following the said automatic tire sealing. FIG. 4B is a further showing a T-joint in the middle of the circumferential tire surface in touch with the ground, and the interior T-joint flat by-passing structure, of the tire compartment system include the further extending T-joint connection interior tire walls.

FIG. 5 is a dynamic perspective axial cross-sectional view taken along Line 5-5 of FIG. 4.

FIG. 5A is a partial cross sectional, internal, principles, dynamic perspective view of FIG. 4B, tire compartment. And the area of the tire puncture or rupture. Showing the dynamic transition of the sealing material to the puncture or rupture area. Further simultaneously showing the tire compartment internal central T-joint, tire wall, further extending and if sealing did not occur, comprising after releasing some air, from the flat compartment, the automatic occurrence of a flat tire compartment by-passing the said T-joint compartments system.

FIG. 6 is a schematic cross-sectional general internal dynamic further perspective view, similar to the explained views of FIGS. 2 and 4, showing the tire structure after either or both coordinated, first, self-sealing and second, rupture withstanding has occurred. Which the second in order is bypassing the rupture area. With a joint compartments, and a wall partition, of interior joint compartment limited expansion. And the first by a dynamic automatic possible tire repair if automatically happen to occur first. Slowing down rapid deflating of the tire compartment by the rupture compartment sealing with the round ball shape substructures by the effect of air pressure gradient from one of the rupture, outer bladders to the atmosphere. In schematic functional range that is in general, proportional to the limit of the T-joint bladder expansion shown in FIG. 5A which is the limit schematic range for the automatic sealing probable occurrence according to the volume of the air pressure remaining within the rupture compartment. The probably general schematic automatic sealing range in correlation to the air pressure intensity remaining in the rupture compartment is shown from FIGS. 2 to 6A.

FIG. 6A is a schematic further in time dynamic perspective cutaway view of an outer flat compartment and radial cross-sectional cutaway internal view of the joint central compartment and joint interior wall, shown in FIG. 1-6 corresponding to a complete release of air in the joint flat outer compartment. therefore, the central compartment is bypassing the puncture or rupture area and the flat compartment with the joint spare compartments.

The inventive tire also includes axially opposing outer bladders 28 and 30 which are defined by the interior volume of said tire arch surface 10 which is not occupied by said interior central bladder. As may be noted, each of said joint opposing outer bladders 28 and 30 exhibit common walls 32 and 34 which extend to central joint wall portion 24 or joint partition 24 respectively with said interior bladder 20. See FIGS. 1 to 12. Exhibiting automatic expansion after puncture or rupture which is bypassing jointly the rupture compartment.

As may be noted from FIG. 3 a reduction in air pressure in any one of said bladders will permit limited joint partitions corresponding expansion of the other bladders into a part of the volume occupied by the bladder experiencing range of reduction in air pressure. See FIGS. 4 to 6A. In general reference to the tire superstructure. A principal dynamic self-sealing test was done. The light substructures having an integral egg shape of Styrofoam flow to, then shield and seal the rupture. So it is proven for the dynamic randomized sealing light super structures to take sealing effect through air-compression and vacuum principles. As already shown and proven in prior art in reference to simple tire self-sealing material. Further the present invention is extending the tire self-sealing prior art into a tire automatic repair as further inventive steps. There is with reference to FIG. 3 shown the usage of the rupture withstanding re-inflatable compartment of FIGS. 1 and 8 with a round ball shaped sealing resilient dynamic substructures 36, in the outer tire bladders 28 and 30. The automatic tire repair sealing dynamic resilient structures marked with the principal numerical symbol 36 which is also a symbol for any functional tire sealing and bonding combination within frangible membrane separation of elastic thin stretchable partitions folding within tire repair materials.

The said sealing automatic tire repair structure further having within a central interior structure, (see FIG. 17 element 102), made from meshed metal or hard rubber which is covered with egg shape spongy elastic polymeric structure, (see FIG. 17, element 103) to withstand overpressure interaction with road surface 42 (see FIG. 5A).

The said automatic tire repair system further having a range of pressure sensitive non adhesive immiscible membrane folds or elastic shells on the automatic tire repair structure external diameter (see FIG. 17, element 104, 105 and 110) including internally three or two intersections of epoxy components bonding combination of resins and hardeners liquid sealant, (see FIG. 17, element 106 and 107) (and FIG. 17B, element 111) in which element 106 is the epoxy hardener, element 107 is the epoxy resin and element 111 is the epoxy hardener or resin mixed with Styrofoam granules.

Further the said elements 106 107 and 111 comprising within said membrane folds of airtight sealed thin elastic partitions any two or three tire bonding adhesive components. The inventor after experiencing with a variety of tire adhesives found to be effective in particular with tire materials of rubber the adhesive "super thin penetrating instant adhesive" under the name "hot cyanoacrylate" or a "very thin penetrating instant curing adhesive" under the name "cyanoacryalte".

The tire rupture area was repaired internally and bonded using the said adhesive together with spongy light semi-hard round rubber balls especially effective tire bond was created with the interior tire rupture area using round nylon balls from one to two inches in diameter together with the said adhesive "cyanoacryalate" or "cyanoacryalte".

Also the said adhesive is available in the market and provided with a non-adhesive immiscible pen sized tube made from non-adhesive immiscible plastic. The said tube is having pointed outlet which can be inserted to the rupture and by squeezing the adhesive out it will enter the tire rupture pressure seal area of contact effecting tire repair thereof.

The said tire repair structures will peel or stretch-off after the automatic tire repair structures air pressurized pocket 108, (see FIGS. 17, and 17A, valve 112) is punctured on the rupture area through friction with the road surface or externally manually with a sharp stick through air compression principles by the effect of a pressure gradient from said rupture bladder to the atmosphere. Resultantly mixing the two or three component bonding combination of epoxy resins and hardeners upon the rupture.

In the event of a rupture of surface 10, see FIGS. 2 to 7, including sidewalls 12 thereof, the tire will be sealed by said sealing super-structures 36 by the effect of a pressure gradient from said outer bladders to the atmosphere. When this occurs the backing joint inner bladder 20 will expand in correlation to the air pressures within the ruptured tire and will exhibit a T-joint response as is shown in FIGS. 4 to 6A (see arrows 44) such that the areas occupied by either outer bladders 28 or 30 will to a limited level correspondingly reduced. Automatic tire repair Randomized dynamic sealing light substructures 36 will to a limited extent flow, then enter puncture or rupture 38 until a sealing has been effected from all possible directions and angles opposite to road surface 42 or rupture tire surface exterior. Thereby a puncture or rupture withstanding and automatic sealing in the surface of said toroidal tire body will be at least first partially functional after certain air reduction sealed and shielded by said automatic system or at least slowing down rapid deflating of the puncture or rupture compartment by said sealing dynamic resilient structures by the effect of the air pressure gradient from one of said rupture bladders to the atmosphere and, secondly, rupture withstanding and partially functional by the randomized joint spare compartments and by the pressure after rupture from the backing T-joint and inner central bladder on said flat tire compartment bladder to a limited integrated joint extend, and therefore forming a flat tire compartment bypassing system so the rupture compartment after some possible range of air reduction will remain resilient and the tire will remain steady and operative notwithstanding also rupture of the tire exterior wall thereof. (Usage of a portable air pump until a sealing has been effected is optional). See FIGS. 4 to 5A. The sealed tire is shown in general in the range of the views of FIGS. 4 to 5A. Also it is to be appreciated to note that through limited expansion of inner joint bladder 20 which is bypassing the rupture area whether or not the automatic tire repair structure 36 or the sealing resilient substructures 36 are used within outer bladders 28 or 30. However, as may be appreciated, the general structural integrity of the system after the said rupture will be enhanced through the usage of the said resilient substructures 36. So the puncture or rupture compartment after possible range of air reduction and a flat will remain resilient. See FIG. 6A, arrow 44. For some time. This time will allowed safety in moving off from dangerous roads.

With reference to FIGS. 4 and 4A light sealing substructures 36 will flow to and integrate into the area of tire rupture 38 which, in FIG. 4A, is seen to include obstacle or sharp object 40 which has become embedded within the area of tire rupture 38 as shown in FIG. 4A, randomized dynamic automatic tire repair structures 36 in a simple structural internal version are preferably selective from a polymer that will bond substantially with the tire material after puncturing peeling and disposing of the said external non-adhesive immiscible membrane of the external said automatic tire repair structure.

Accordingly as randomized dynamic light sealing super structures 36 flow to the area of puncture or rupture 38 they will be subjected to substantially enhanced pressure also by friction through their interaction with the road surface 42 and obstacle 40. Further the expansion of inner bladder 20 (see FIGS. 4 to 7) will operate for backing air pressure to sealing substructures 36 from a direction and angle opposite to road surface 42 or a direction and angle opposite to the tire puncture and rupture surface exterior. Arrows 44 (in FIG. 4 to 7) are correlated to the external pressure of between circumferential surface 10 of the toroidal tire body and road surface 42. Further turn the puncture or rupture intersection to the six o'clock position, such as to optionally use a portable air pump to re-inflate a rupture compartment to effect a tire sealing.

Figure 8:
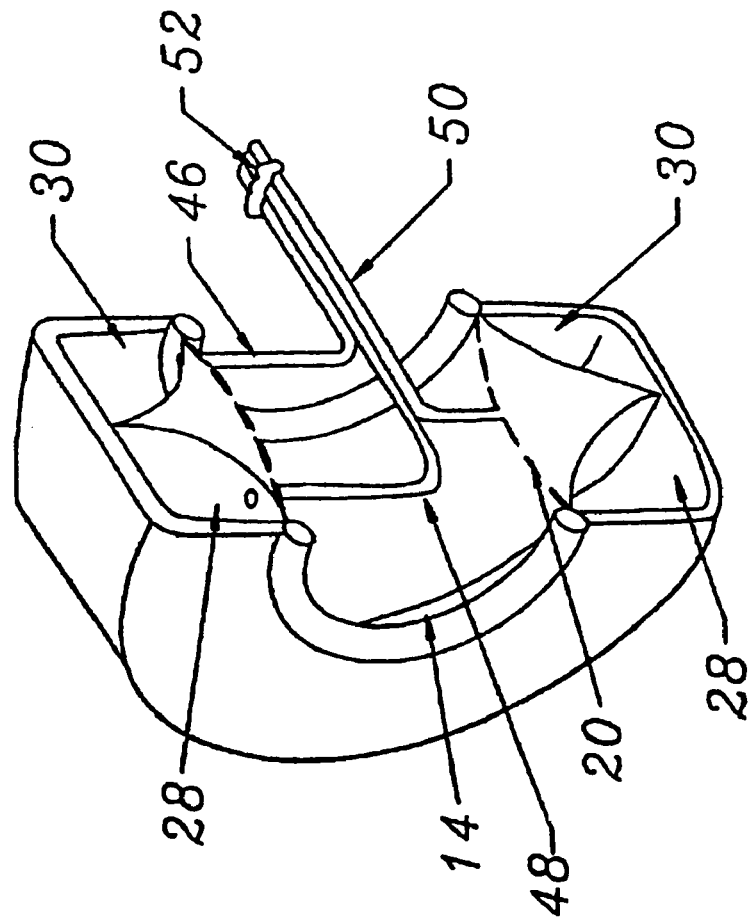
FIG. 8 is a perspective breakaway diametric view of a further embodiment of the invention, first shown in FIG. 1.
Figure 8A:
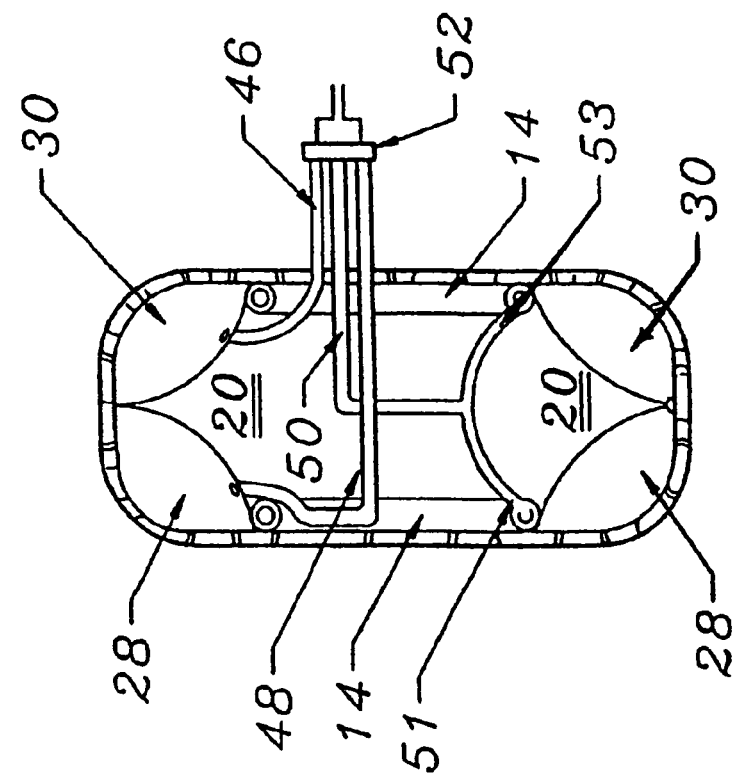
FIG. 8A is an enlarged detailed view of FIG. 8.
Figure 9A:
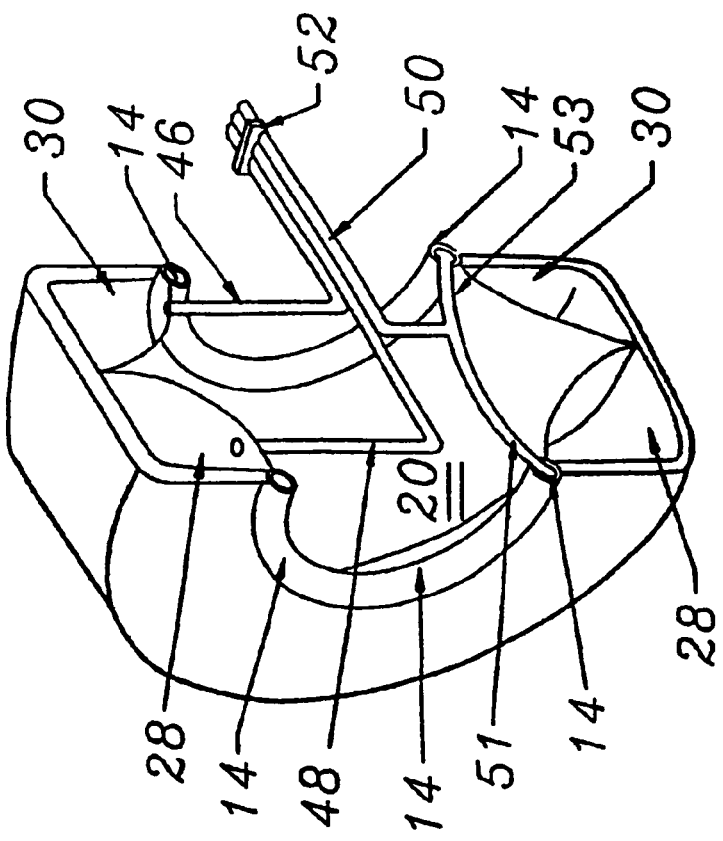
FIG. 9A is an enlarged detailed view of FIG. 9.

Accordingly subjecting randomized dynamic automatic tire repair structures 36 to substantially enhance air pressure to insure complete tire sealing and further in order and time to effect automatic tire repair. In FIG. 8 through 12 are shown various tire arrangements with air channels, and valves arrangements of the multi-compartment automatic tire as above described including the inflatable tire beds forming the integral sealing ridges 14. Wheel integrating through air pressure into the wheel 64 and therefore to wheel shoulder 65 (see FIG. 18 and FIG. 1A) in FIG. 8 to FIG. 9A there is shown an arrangement wherein three inlet channels 46, 48 and 50 are shown in connection with bladder 20 and inflatable outer bladder 28 and 30. Further in connection wheel integrating said sealing ridges 14 (see FIG. 8A and FIG. 9A) which are inflatable through channel 51 and channel 53 which connect to air channel 50. An axial cross sectional view appears in FIG. 9A. There from optionally derivative from organized gaseous multi valve input 52, the bladders and sealing ridges of the tire compartment system may be filled with air.

Figure 11:
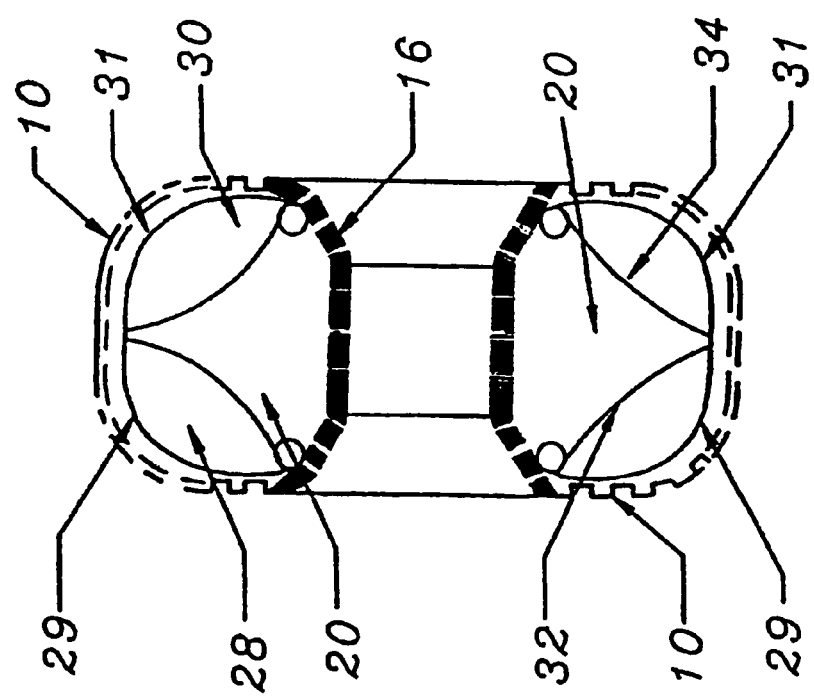
FIG. 11 is an operational view of the structure of FIG. 10.

Note also effecting in correlation to the air pressure volume the multi-surface external tire diameters principally shown by arrows 33 in FIG. 11. In reference to the tire insert of FIG. 8 an optional joint tire insert structure for do-it yourself people may be integrated with an external tire for safety performance and simplicity.

Figure 12:
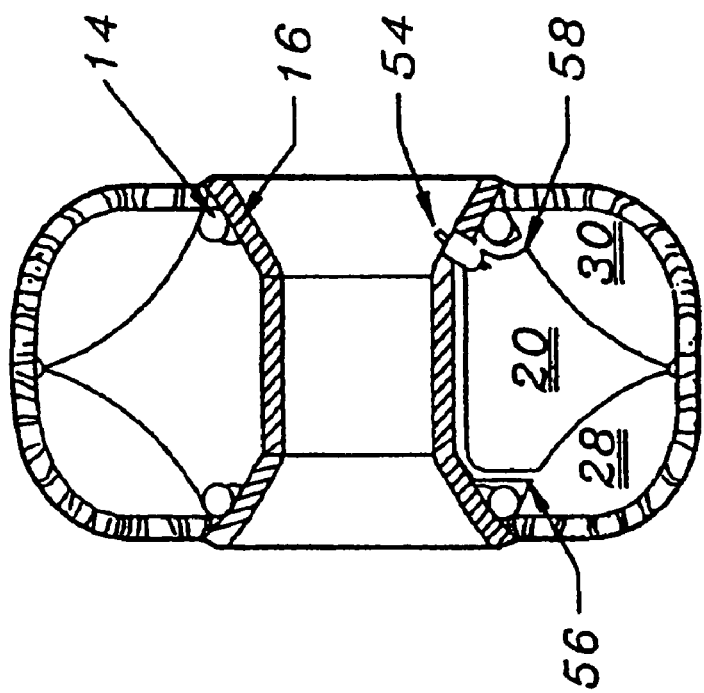
FIG. 12 is an axial diametric cross-sectional view of the embodiment of FIGS. 8-11.

In FIG. 12 is shown an optional multi-valve arrangement for the above-described embodiments of FIGS. 1 through 7. Therein is shown a multi-valve air inlet 54 positioned upon wheel 16 in a simple fashion, that is, in the same fashion that an air inlet valve would be positioned in a regular automobile wheel. However, from said multi-valve inlet 54, pressurized air is inputted directly to central internal bladder 20 and, through channels 56 and 58, to outer tire bladders 28 and 30 respectively.

Figure 12A:
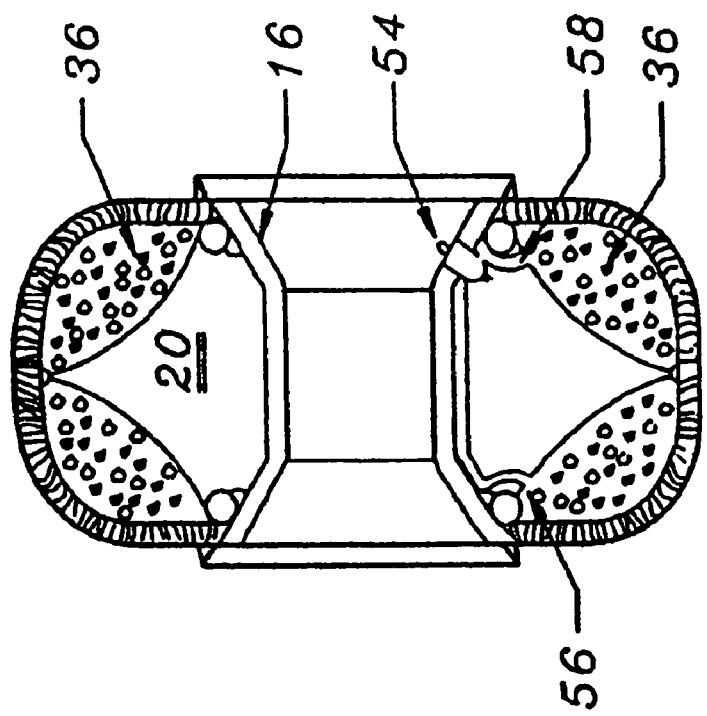
FIG. 12A is a view, similar to that of FIG. 12, however showing the use of self-sealing substructures within the partitions.

The embodiment of FIG. 12, including the multi-valve air inputs therefore, is shown with the described sealing light substructures 36 in FIG. 12A.

Figure 13A:
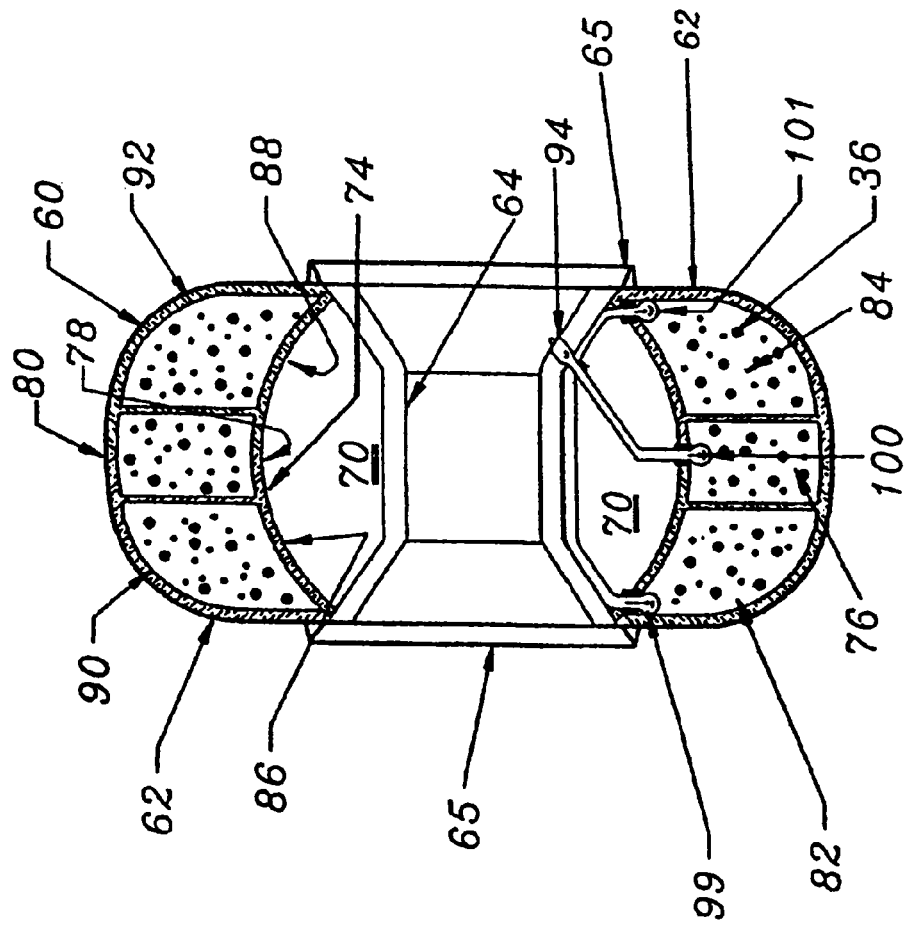
FIG. 13A is an enlarged view of FIG. 13, however showing the use of self-sealing substructures within the partitions thereof.
Figure 14A:
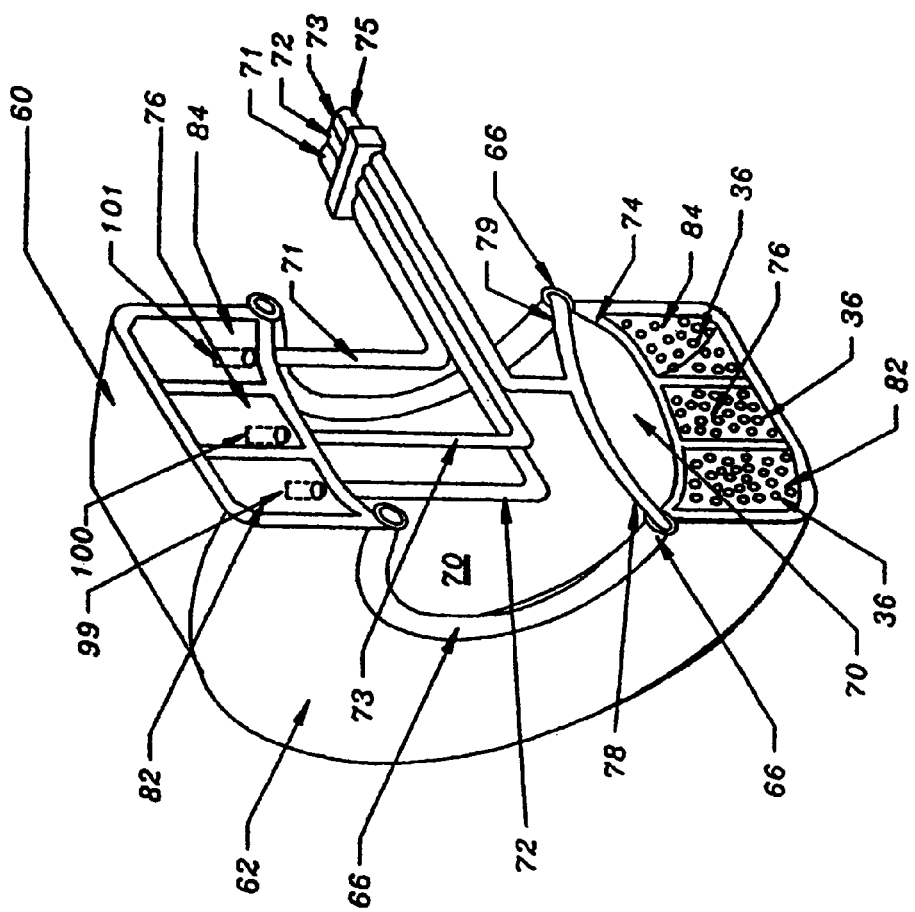
FIG. 14A is an enlarged view of FIG. 14, however showing the use of the self-sealing bead and substructure thereof within the partitions of the tire.
Figure 16:
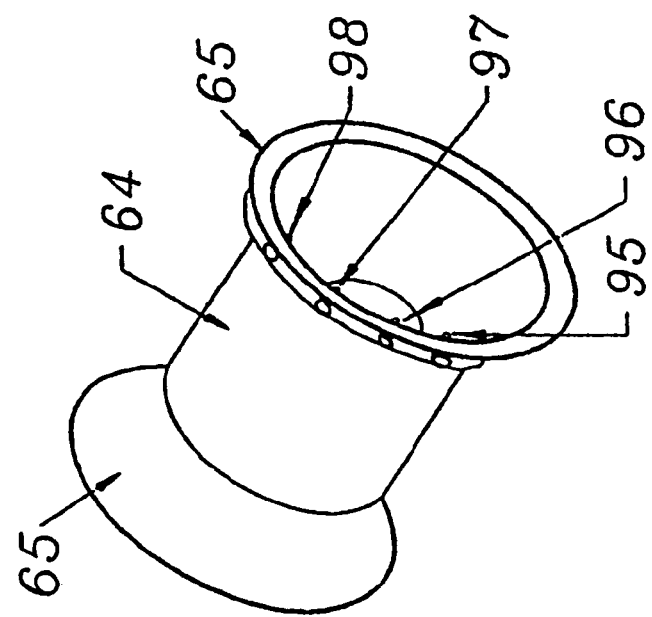
FIG. 16 is a perspective view of the wheel of FIG. 15.
Figure 15:
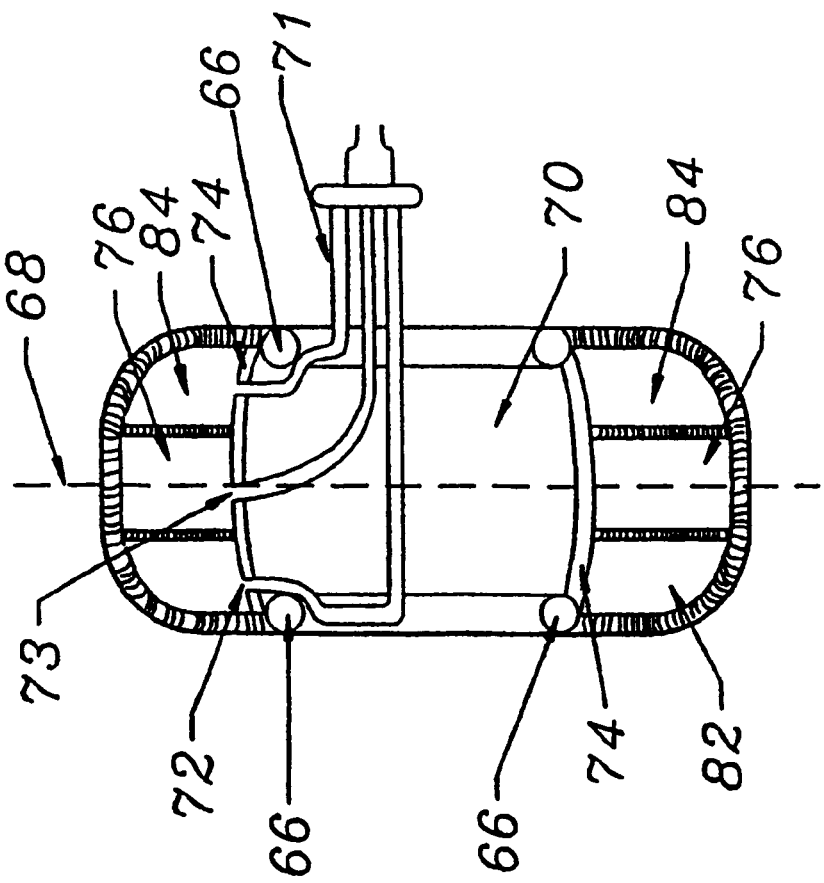
FIG. 15 is a diametric cross-sectional view of the structure of FIG. 14.

With reference to FIGS. 13 and 13A, there is shown in FIGS. 13 to 15 further embodiments of the said invention comprising a tire defining a hollow toroidal body which includes an arched circumferential surface 60 including sidewalls 62 which extend axially symmetrically into contact with wheel 64 (see FIG. 16) in which circles of contact are defined by polar air inflatable tire beds forming the wheel sealing ridges 66 which are optionally air pressure inflatable and deflatable particularly for easy access to the joint interior tire structure after a rupture, and for smooth assembly and safe mounting principally shown in the above described embodiment. See FIG. 14A wheel sealing ridges 66 are filled with air through channels 78 and 79 which communicate with air channel 75 in the organization of the valve air input. The embodiments of FIGS. 13 to 15 are symmetric about a plane of symmetry 68. See FIG. 15.

Further there is provided an interior joint bladder 70, see FIGS. 13A and 14A which also can be pressurized with a tire tube, and extends completely about said wheel 64 with an interior circumferential surface 74 thereof bladder 70 is defined and limited by the lateral surface of wheel 64. And said interior bladder 70, at its greatest axial extent, is defined by an interior solid circumferential surface 74, see FIG. 13A.

Figure 10:
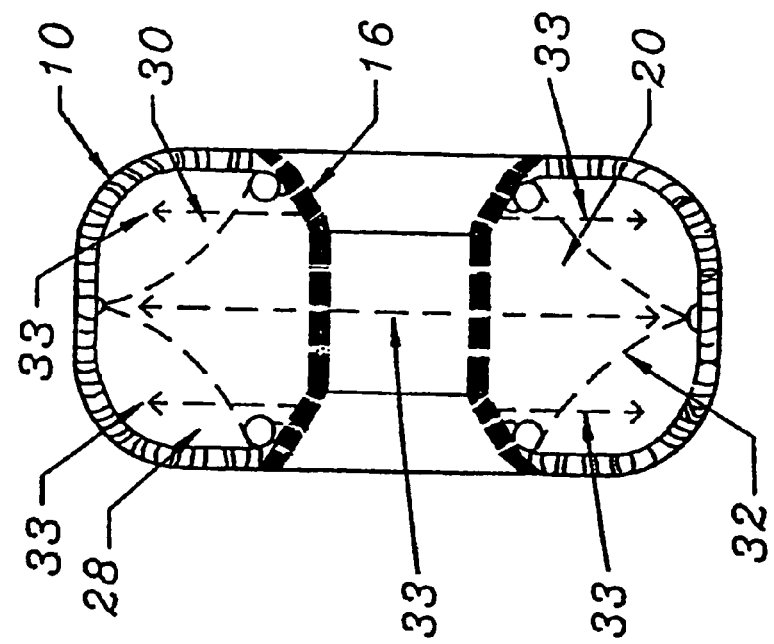
FIG. 10 is a schematic, axial diametric cross-sectional view

The tire versions of the embodiments of FIGS. 13 to 15 further includes a joint central axial bladder 76, which is disposed about said axial plane of symmetry 68. Said bladder 76. (See FIG. 13A) exhibits a radial inner surface 78 in common with said interior solid circumferential surface 74 and, further, exhibits a radial joint outer surface 80 in common with an interior surface of said radial arched surface 60. The joint structure thereof further includes first and second opposing joint bladders 82 and 84 on respective opposite axial sides of said central joint bladder 76. Radial joint inner surfaces 86 and 88 of opposing joint bladders 82 and 84 respectively are defined by said inner solid circumferential surface 74 of said inner bladder 70, while outer surfaces 90 and 92 of said opposing joint bladders 82 and 84 respectively are defined in common by the interior surface of said arched circumferential surface 60 of the toroidal tire. The said multi-compartment joint tire structure having a tire stress alternating proportional inflation pressures which distribute tire stress evenly, or distinct air pressures for outer joint marginal stress distribution to surfaces 80, 90 and 92 having optionally three distinct tread patterns for all season braking and traction. The tire insert variations of FIG. 14 can be mounted in any external tire on an axle wheel. The variations of a multi-compartment joint independent tire insert FIGS. 1 and 14 are integrated in general reference, one or a few combinations of the shown structures: internally within a regular tire or customized exterior tire. See FIGS. 10 and 14. In FIG. 10 insert-surfaces 29 and 31 are air pressure-integrated with outer tire internal surface 10 and distribute distinct proportional air pressures. The multi-compartment tire is having an optional insert version for low pressure tire which is analogous to a multi-compartment inflatable light tire dressing the wheel with compartment extending to the wheel surface air pressure gripping the complete wheel surface. One or a few combinations of shown FIG. 15 with integrated valves can be mounted on the axle wheel internally within the external tire, air pressure integrating with the external tire and pressurizing the complete wheel surface with the inflatable internal circumferential surface 74 (see FIG. 15). This version is effective mostly for low-pressure tire, like small motorcycles and bicycles.

The operation of the second embodiment is analogous to the first embodiment of the invention thereof include general joint marginal stress distribution in compartment reference to the stress alternating embodiment of FIGS. 1 through 10, so that a compartment blow-out will be effectively handled, and manual tire repair on the highway rendered unnecessary.

With reference to FIG. 13A, the above-described embodiment is shown and provided with automatic tire repair dynamic light sealing substructures which are non adhesive and immiscible having externally immiscible membrane separation folding within said areas of separation varieties of epoxy mixed with tire bonding polystyrofoam or polyurethane in size correlation to tire size and air pressure volume as well, provided with an organized optional multi-valve 94 optional for use with the described embodiment. But, in FIG. 16, valves on hub wheel 64 are air inlets 95 to 98. In connection with the compartments 70, 76, 82 and 84 of the tire. See FIG. 14 to 15. See in reference compartments 20, 28 and 30 in FIG. 8. The use of the said multi compartment structure is in connection with the temporary removable tire compartment air channels removing the air channels for selective filling of the compartments in the air inlet points with said sealing automatic tire repair structures. To protect the tire air valves and air channels from clogging by said light sealing superstructures, a screen shield is mounted in the air outlet of the said tire compartment which are having screen shield in outlet points shown by arrows 99, 100 and 101. See FIGS. 13A and 14A.

Figure 18:
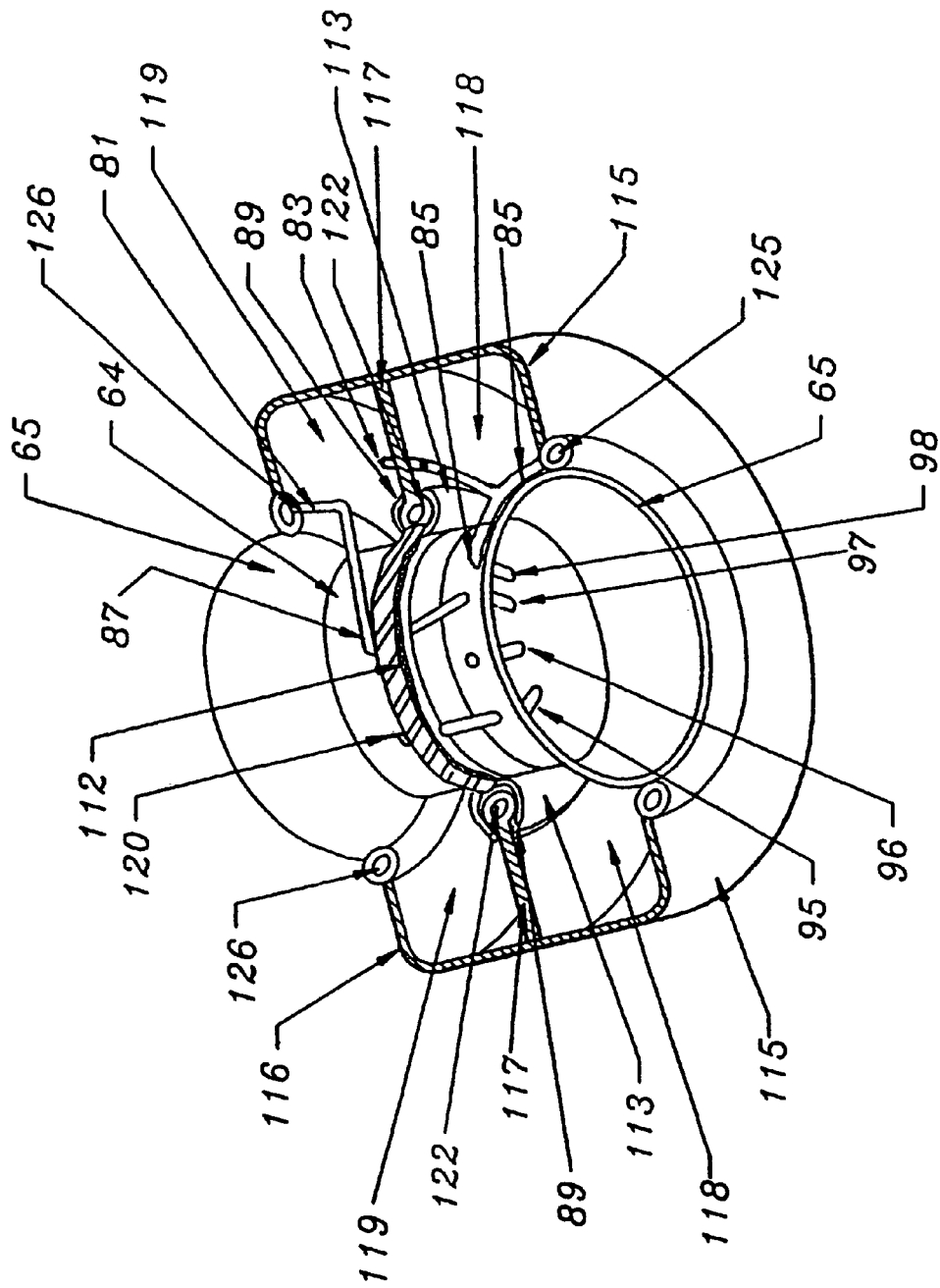
FIG. 18 is a perspective diametric cutaway view of a third embodiment of the invention.

In reference to any number of clog preventive air valve and air inlets or air outlets organized and integrated into the said wheel. FIGS. 1 and 13 are optionally mounted as an insert in any tire or in the same principle in walls integrated triple tire or double tire on multi-compartment integrated triple or double axle wheel. Also the embodiment of FIG. 1, can be combined with in the embodiment of FIG. 13 and vice versa in one or a few combinations for any customized joint multi compartment tire requirements. In FIG. 18 it is shown a schematic perspective view of a double tire mounting principle on a double axle wheel with a cross-sectional central cut-away view of a wheel c-clamp partition, 112. Shown in c-clamp point 89 integrated with the inflatable tire beds which are forming inflatable sealing ridges inserted inside (C)-clamp 89 shown by inflatable element 122 which extends from the end of central tire wall 117 and is optionally inflatable from internal valve 83 which is mounted on wall 117. Valve 96 inflates compartment 118 which includes tire wall 115 and said inflatable wheel sealing ridge 125. Valve 95 inflates compartment 119 through air channel 120 and which includes compartment tire wall 116, pressing tire wall 116 into wheel 64 and wheel shoulder 65 with the wall 116 extending inflatable wheel sealing ridge 126. Sealing ridge 126 in point 81 is inflatable through air channel 87 connected to air valve 97. Sealing ridge 125 is inflatable through channel 85 which is connected to valve 98. The circumferential c-clamp wheel partition 113 is functional for both sides of the tire which shared central tire wall 117. Air channels 120 and 87 cross the c-clamp circumferential wheel partition 113 near the wheel 64 surface and are mounted to valve 95 and valve 97. The c-clamp circumferential partition structure 113 is an integral part of the wheel 64 or it is welded to the wheel 64.

Figure 18B:
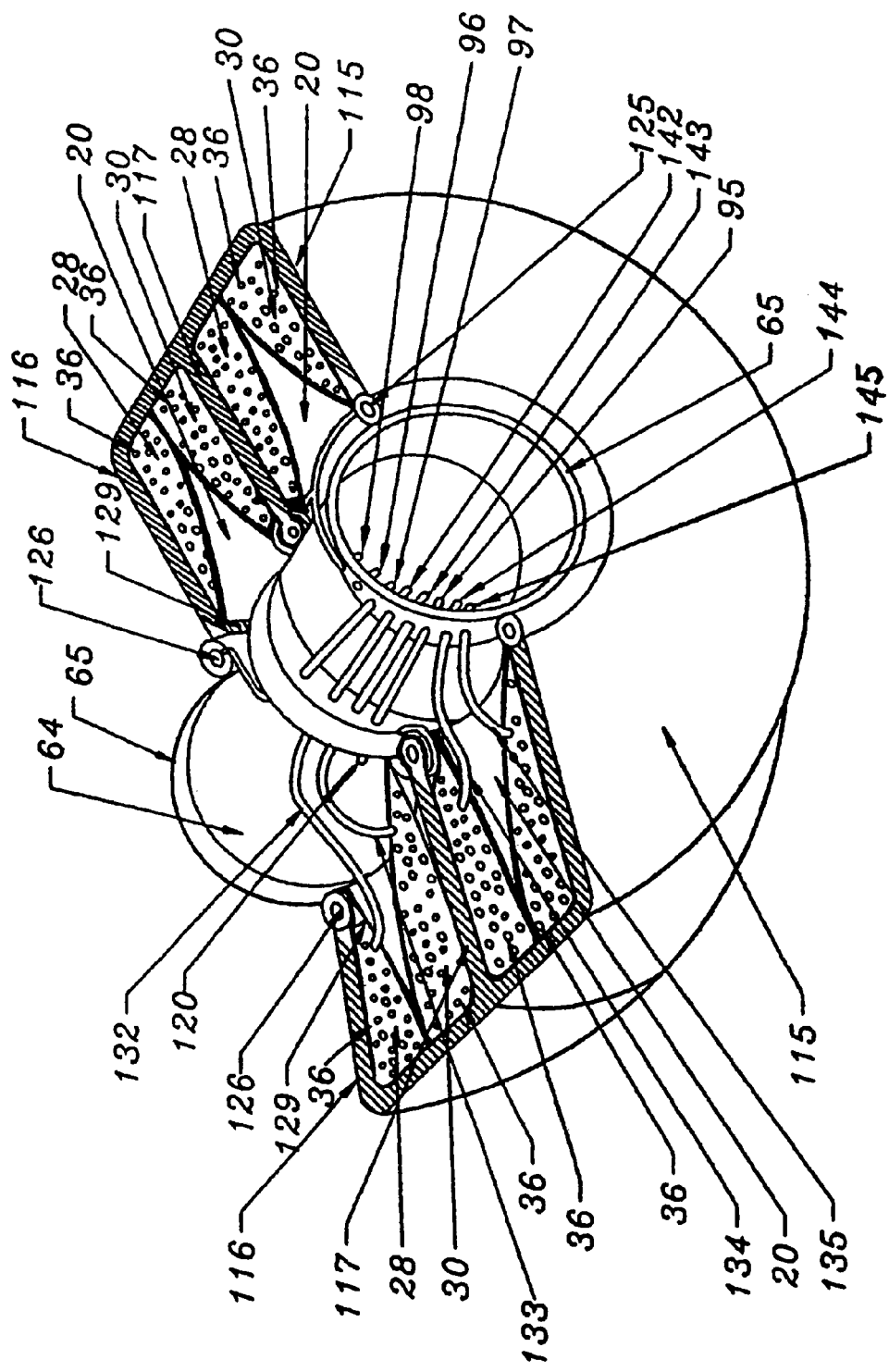
FIG. 18B, is a perspective view of a further embodiment showing a dual tire system having redundancy of internal tire structure similar to the individual tire structure shown in the embodiment of FIGS. 1, 1A and 3.

FIG. 18A is adapted for light sealing automatic tire repair. FIG. 18B is a view of FIG. 18 with the use of the tire insert versions of FIG. 1, 2 or 8 integrated within the tire compartments as already shown in FIG. 10. And with optional tubing in the tire insert central compartment as already shown in FIGS. 8 and 9. The insert central compartment connects to valve 96 in the first front view compartment perspective, and to valve 95 through channel 120 in the second in order following tire back compartment perspective view of the two shown external tire compartment 118 and 119, see FIG. 18 Valve 144 and 145 through channels 134 and 135 inflates the said joint tire compartments which are inserted in the first front view perspective tire compartment between wall 115 and wall partition 117. In the second in order following tire compartment perspective view. Valve 142 through channel 132 inflates the said insert tire compartment near wall 116, and valve 143 through channel 133 inflates the said insert tire compartment near wall partition 117, so this tire structure which can be mounted and installed in exterior tire variations together with the automatic tire repair light sealing structures 36 is optional for hazardous tough roads or for additional safety requirements. In general reference the internal tire structures are assembled first in order by inflating the central compartment which is closer to the wheel surface and therefore the following in order compartment and disassembles in the opposite order. Further it should be noted that the external tire insert structures which internally includes the automatic tire repair system are much easier to maintain when using the present invention wheel assembly, having a radial steel belt and optionally inflatable, removable rim flanges or inflatable integral wheel flanges.

The tire mounting system may include optional integral inflatable tire beads that are formed wheel sealing and locking sealing ridges.

FIG. 18B is a schematic view of FIG. 18 with a use of the showing joint, structural trigonal or trihedral. FIGS. 1 to 12 integrated as an insert within the shown compartments of FIG. 18, as is in the reference shown in FIG. 10. The said joint insert having optional tubing in the central insert compartment as shown in reference in FIGS. 8 and 9 and with the reference, general, possibility as well to integrate with quadruplet FIG. 14A, which can be installed within the compartment of FIG. 18.

Figure 19:
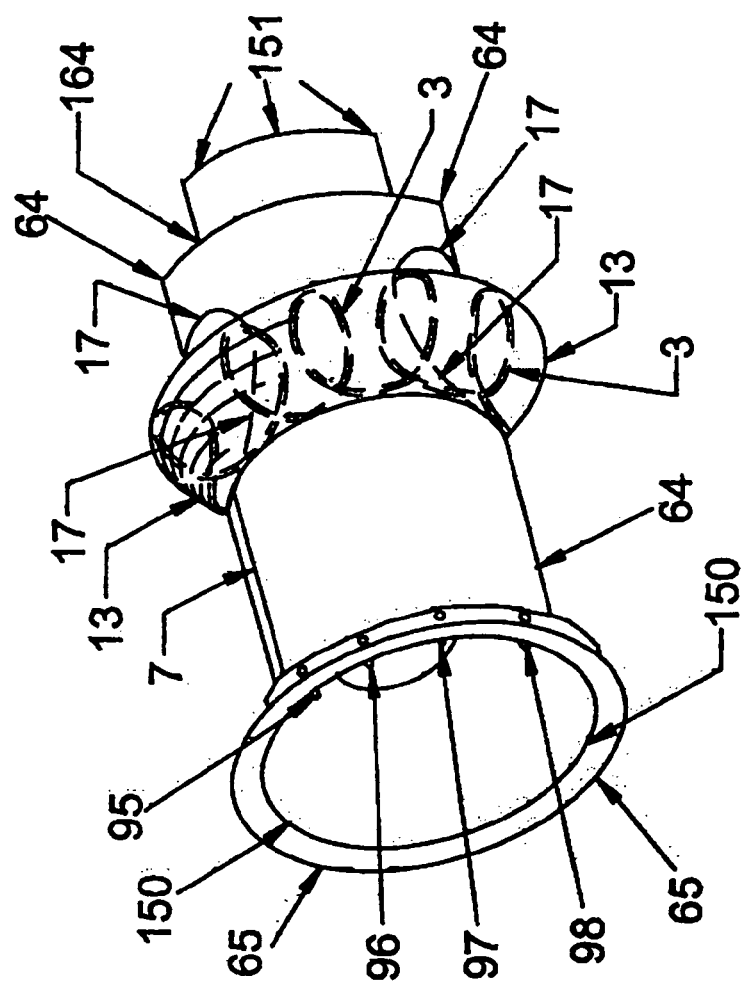
FIG. 19 is a perspective view showing the tire structure of FIG. 20 attached thereto.

With reference to FIGS. 19-27, the invention may include a related safety mechanism. Include modeling example and custom made procedure broad in scope, through safety joint mechanism and safety bearings particulars. Which are showing united, combinatory detailed, practical view, regarding the wheel-rim system in FIGS. 1A to 18B. Described embodiments include a parts variations. The tire assembling wheel rim system modeling safety mechanism broad in scope is shown and described in FIGS. 1A, 18, 8A 18B, and 19-27, and is in reference to FIG. 27. The inventive practical modeling of the tire retaining combinatory wheel-rim system in FIG. 19 is shown with the spirally or cross-spirally belted mounted and dismounted flange-belt organization 13. Composed from variety of materials, such as nylon, rubber, plastic, and general tire materials. Which are having a degree of practical stretch-ability, as to form the shown flange-belt together with an optionally cross-spiraled belting merged structures, for compatible stretch-ability.

The belt-flange core cross-spiraled safety mechanism is designed to stretch only lengthwise, in the circumference, but remain tough and hard crosswise, from the sides, for mounted tire-wall interfacing. Belt flange 13 is mounted and dismounted on groove 17 shown having, wheel rim in-curved circumferential diagonal angle of 45 degrees of angled in-curved hook-claim shape.

Figure 20:
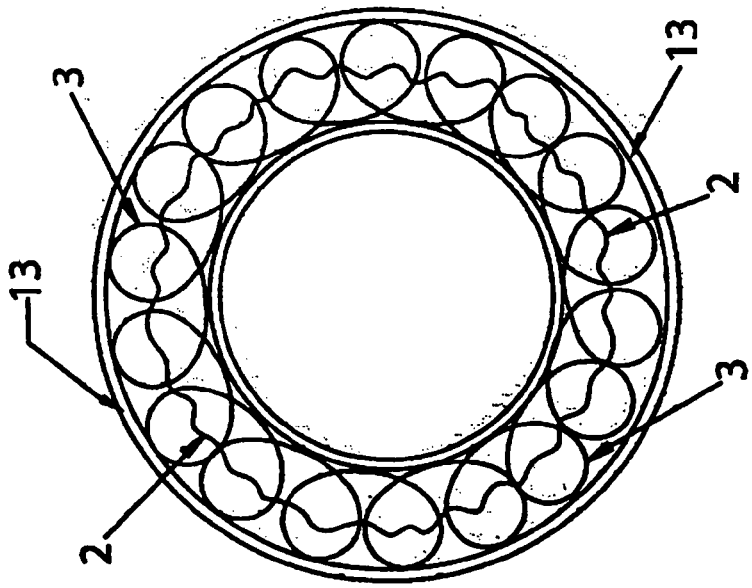
FIG. 20 is a polar cross-sectional view of the internal partition structures.

The wheel-rim-groove angled, hook-claim circumferential shape, is optionally only on the groove side of polar wise hook side, which is supposed to form integrated belt-flange fastening, safety mechanism or tire wall interfacing pressure, to withstand the tire wall pressure of the tire mounted upon wheel-rim 64 shown. In FIG. 27, the tire wall pressure stretch-interject the groove mounted belt flange to completely settle into the circumferential hook-clamp shaped groove. The opposite circumferential in-curved groove side, of in-curve, belt flange dismounting, reversing, side, embracing an diagonal in-curved shape, for releasing the belt flange 13 easily form the diagonal groove circumferential border line 11 showing in FIG. 27. For dismounting after releasing the air from the tire therefore. FIG. 19 is similar to the wheel-rim systems 64 shown in FIG. 1A and to wheel-rim system 16 shown in FIGS. 2-7. FIG. 1A showing the wheel rim system 64 modeling view that is made by cutting off the metal flange or shoulder from the general conventional wheel-rim having two metal shoulders. Then welding circumferentially the wheel-rim extension cylinder 151 having a compatible length and width to the internal wheel rim cylinder of wheel rim 64 in the wheel-rim cylinder 64 internal circumferential surface of wheel rim cylinder polar wise, circular line 150. For purpose of in curving wheel-rim integrated, rim grooves diagonal angles bearing shapes. The wheel rim extension 151 is extending groove 17 upon wheel-rim 64. Wheel rim extension 151 is further extending from wheel-rim 64 in point 164. For safety and experiencing with a variety of rim-grooves and belt-flanges mounted upon the wheel-rim cylinder extension 151. Only the hook-clamp shaped grooves including the mounted flange-belt are proven to safety hold the 30-50 "psi" tire pressure interfacing belt flange, include reference to tire pressure of "41 psi" tire extra load pressure. FIG. 19 modeling approach offers a number of options to make safety customizing incredibly practically mostly for achieving safety and mostly for achieving the final product. Wheel-rim extension 151 is welded optionally on both sides of the wheel rim cylinder 64 after cutting off optionally the other metal wheel rim shoulder from wheel-rim 64. On wheel-rim cylinder 64 circumferential border in internal circumferential line 150. FIG. 20 is showing the dismounted belt flange, otherwise shown mounted in FIG. 19 on groove 17. The belt flange 13 is dismounted from groove 17 by pulling the structurally cord stretch limited flange belt 13 in FIG. 19 to the wheel-rim cylinder surface 64. Lubrication is optional for smoother dismounting. The dismounting approach is to stretch flange belt 13 from the groove 17, over the wheel-rim cylinder surface 64. Otherwise structurally, cord-stretch level limited flange belt 13 is manual stretch dismounted in the direction of the groove 17, border line 11 shown in FIGS. 26 and 27.

Figure 21:
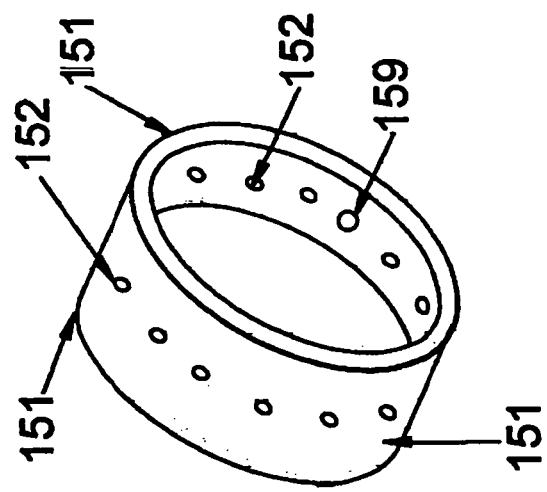
FIG. 21 is a detailed view of the right end piece of the structure of FIG. 19.
Figure 22:
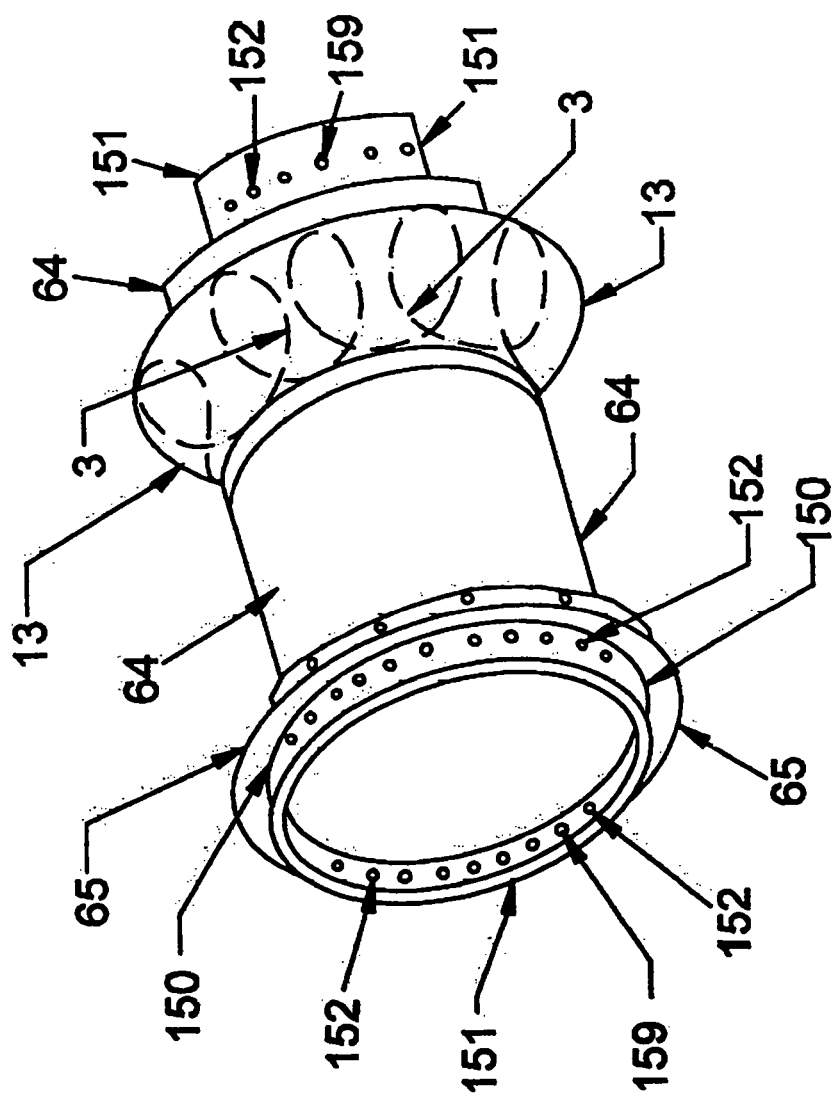
FIG. 22 is an enlarged detailed view of FIG. 19.
Figure 23:
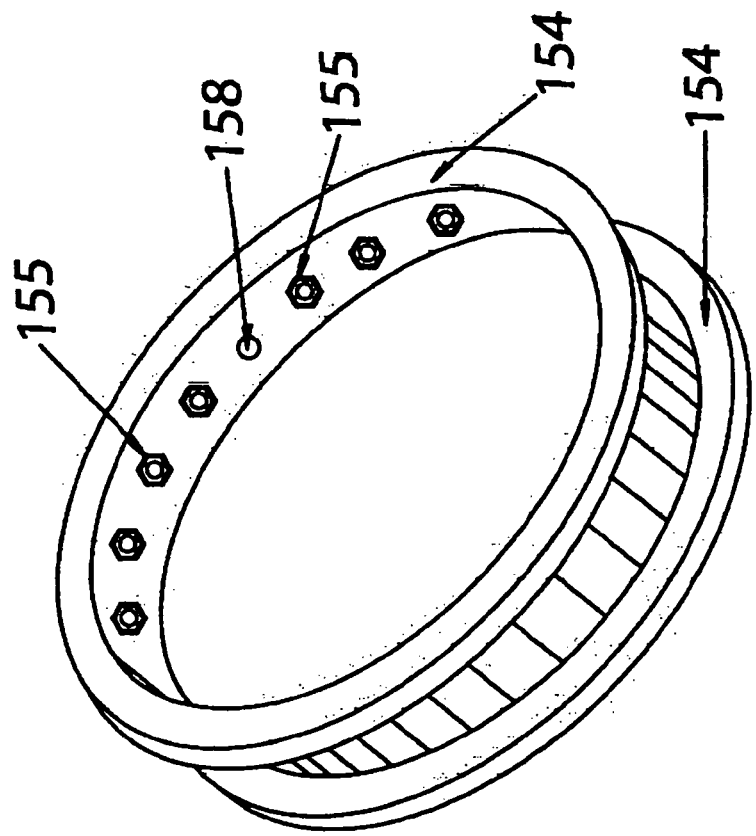
FIG. 23 is a detailed perspective view of the ring structure shown to the left of FIG. 22.
Figure 26:
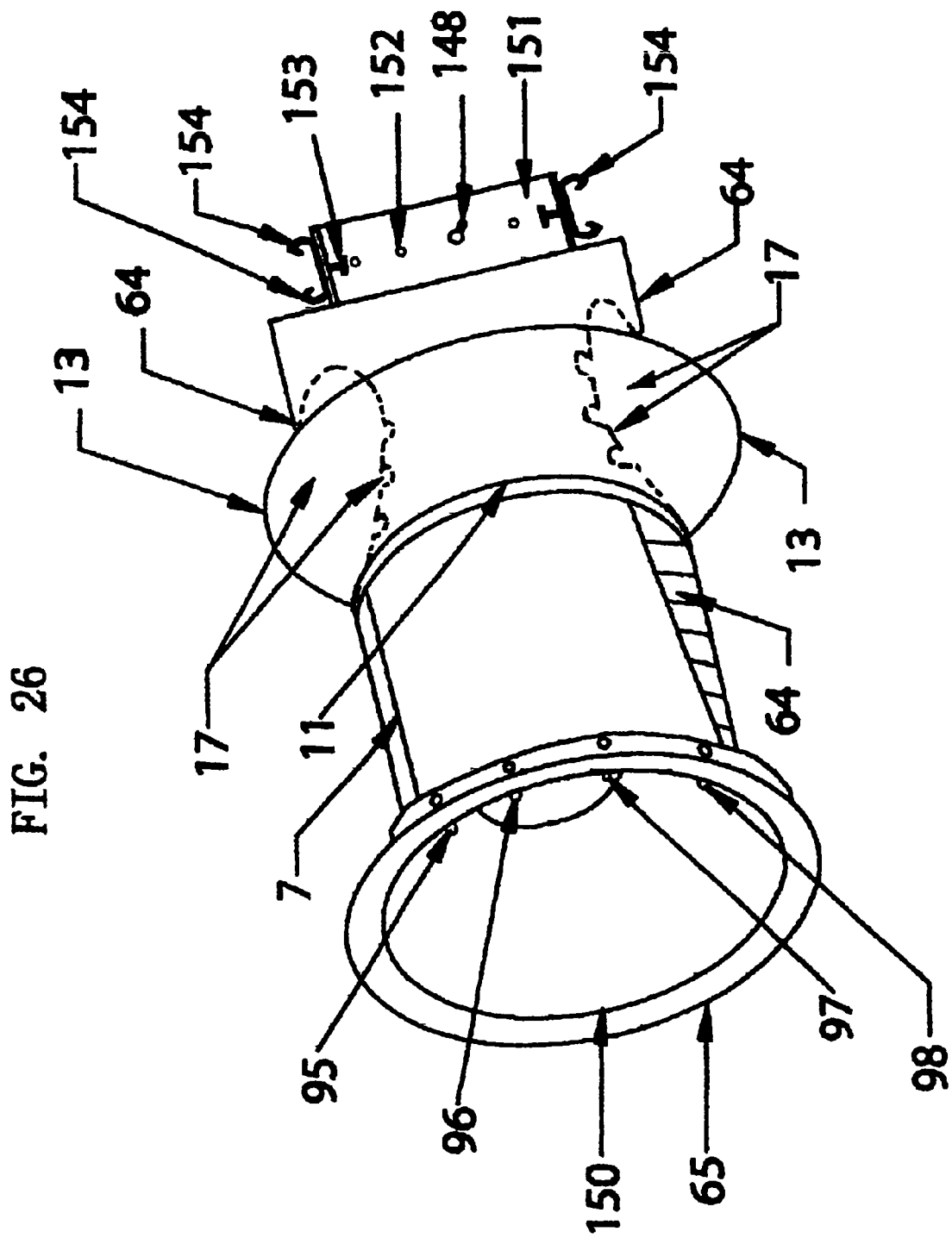
FIG. 26 is a perspective view of a yet further embodiment of the invention.
Figure 27:
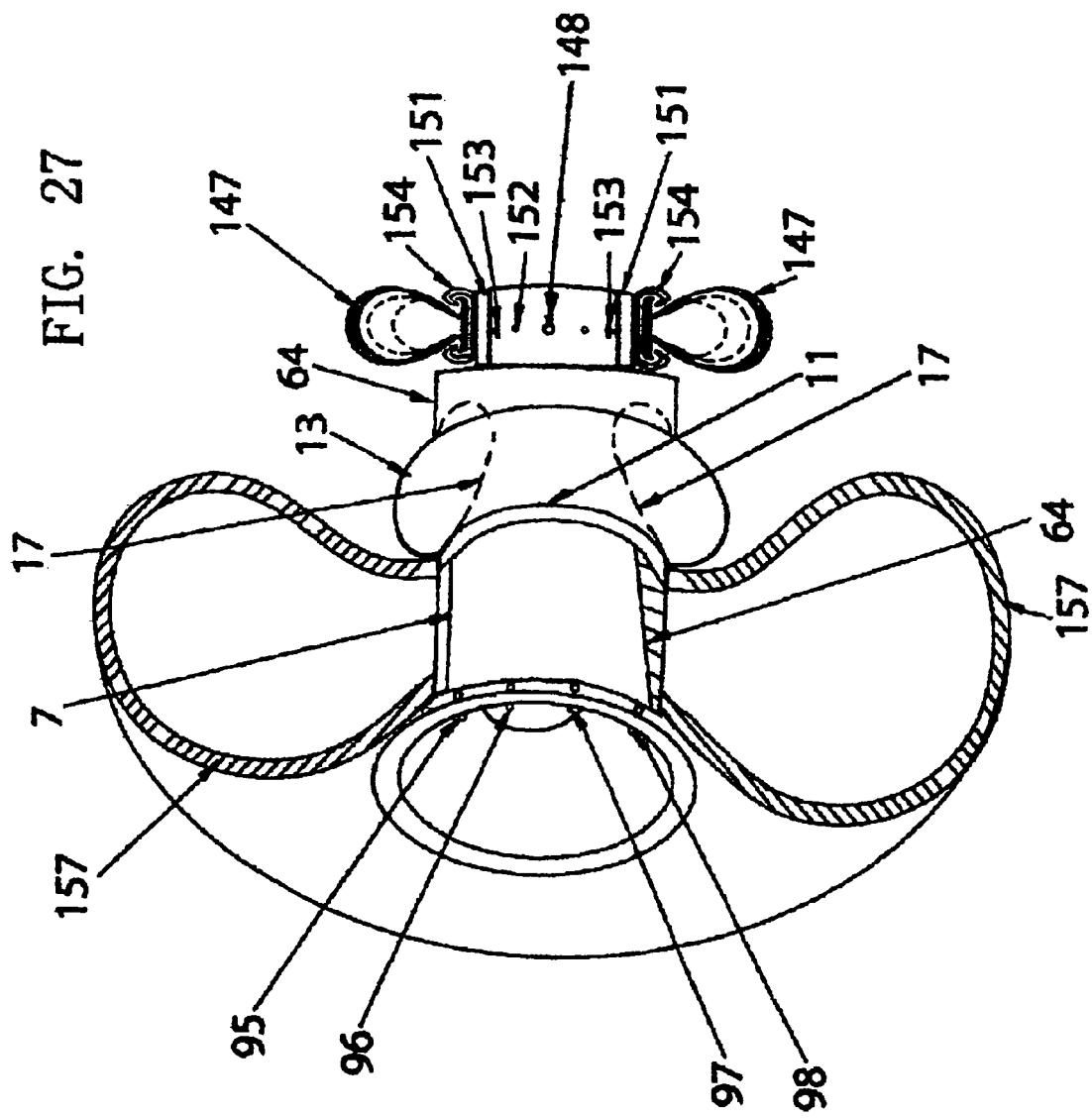
FIG. 27 is a perspective view of a still further embodiment thereof.

The circumferential hook-clamp shaped groove opposite side is supposed to be a diagonal in-curved smooth and flat for releasing the structurally stretch-limited flange-belt flange 13 easily from the groove 17 circumferentially border line 11 shown in FIGS. 26 and 27. For the complete dismounting from wheel-rim 64, and wheel-rim extension 151 which is a tire mounting and dismounting related, to the wheel extension 151 external circumferential diameters, compared to wheel-rim 64, circumferential external diameter. The shown belt-flange 13 in FIG. 20 is a flange-belt organization that is structurally circumferentially lengthwise, cord-stretch limited and of crosswise hardness. The flange-belt is having within cross-spiral belted pattern shown circumferentially internally within belt flange 13 at point 3. The belt flange 13 in FIG. 20 incorporates internally, additionally internal patterns, forming circumferential lengthwise structurally limited stretch-ability of cross-spiral patterns smaller in diameter, shown in Line 2, but are analogous to the spiral pattern shown in line point 3 circumferentially. The additional belted smaller, cross-spiral schematic patterns, are otherwise analogous to the circumferential pattern shown in spiral line 3 in FIG. 20. The semantic pattern in flange belt flange 13 is shown circumferentially internally in structurally stretch-ability-limited line 2 within flange belt 13. Line 2 pattern includes optionally additionally internal shapes having circumferential air cavities within the cross spiral line 2. For using the flange-belt structure in air inflatable form. The flange belt is having within extreme air pressure verities, above 100 "psi" for additional stability, hardness, strength, and toughness to withstand the interfacing wheel-rim mounted tire wall-side pressure, but to promote practical limited circumferential lengthwise stretch-ability. For easy mounting and dismounting the wheel-rim organization 64 shown in FIG. 19. Further, the shown belt flange embodiment organization in FIG. 10 is functioning simultaneously with the tire retaining, wheel rim flange belt function, as emergency wheel after a flat tire situation. FIG. 21 is showing the wheel-rim extension 151 includes compact length and width. For a compact wheel-rim-grooves safety angle bearings foundation and simple understood approach of a wheel system compatible length and width having screw aperture inlets 152 for mounting and dismounting upon the rim 154 in FIG. 23. Including within hook-clamp shaped groove having angled in-curved shape varieties. Wheel-rim extension 151 in FIG. 21 having optional valve aperture inlet 159 for inflating the belt flange mounted upon the proper deep enough wheel rim angled rim-groove. Nevertheless, flange-belt 13 schematic pattern shown in FIG. 20 is most suitable. The wheel-rim system in FIG. 22 is similar to the system shown in FIG. 19. Shown in the wheel-rim extension 151 in FIG. 21 welded to the opposite sides of wheel-rim 64, in the wheel rim 64 internal surface shown in circumferential line 150 in reference to the practical modeling range safety approach. FIG. 23 showing rim 154 having inner curved shaped groove. The rim 154 internal circumferential diameter is having nut aperture inlet 155 for mounting the rim 154 upon wheel wheel-rim extension 151 shown in FIG. 21 with screw. Optional air valve inlet is shown in point 158 in FIG. 23. The rim 154 within a hook clamp-shaped groove variations.

Figure 25:
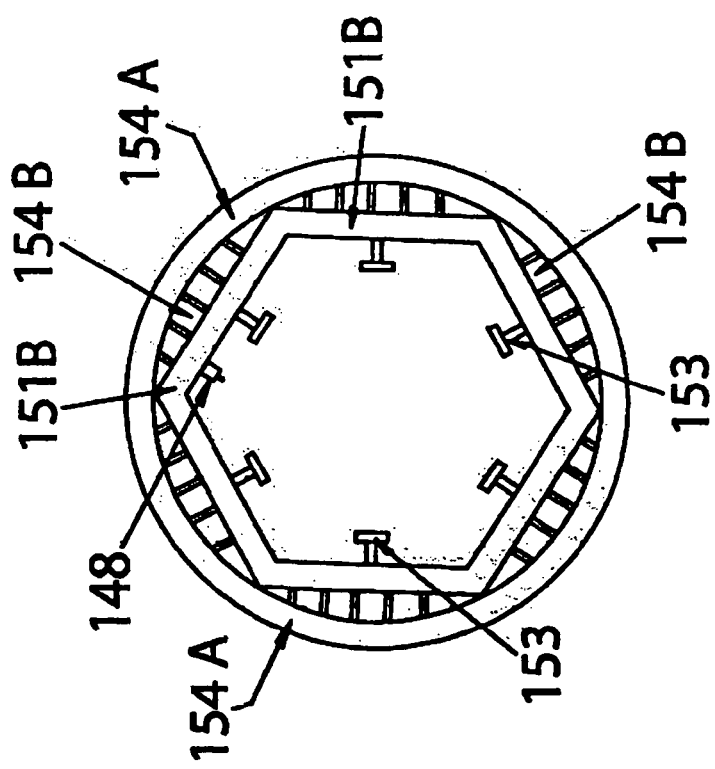
FIG. 25 is a radial cross-sectional view of the circumferential bracket structure shown in FIG. 24.

The hook-clamp shaped groove is having a wide flat interface bottom, for a fasten mounting and dismounting wider range then the groove inner curved circular entrance for secure stretched mounting and dismounting of regard to shown belt flange 13 in FIG. 20. FIG. 25 shows rim 154 of FIG. 23, mounted upon a circumferential structure 154B having external circular shape and internal hexagon shape. The structure 154B having circular external size of equal diameter to the internal diameter of rim 154 shown in FIG. 23. To match rim 154 upon the circumferential external surface 154B. The mounted rim 154 in FIG. 23 is including the hook-clamp shaped groove within rim wall 154A in FIG. 25.

The rim wall 154A can be extended by customizing the rim wall circumferential diameter range and its angled inner curved hooked-clamp shaped groove. The rim wall 154A circumferential diameter range is meant for customizing hook-clamp shaped grooves to mount and dismount upon securely the belt-flange 13 shown in FIG. 20 according to requirements. FIG. 25 shows screws 153 integrate rim 154 shown in FIG. 23 with hexagon structure 154B mounted on hexagon shaped wheel-rim extension 151B with integrating screws 153. The hexagon shaped rim mounting system included the compatible belt-flange 13 shown in FIG. 20 is for showing practical options for wheel-rim system 64 to withstand high vehicle speed and safety braking, especially in regard to flat tire situation. Otherwise dynamic view correlated to rim-groove of the wheel-rim system shown in FIG. 1A and with wheel-rim 16 in FIGS. 2-7. The wheel rim system safety belt-flange and rim mounting organization shown in FIG. 25 will increase safety on the road.

Figure 24:
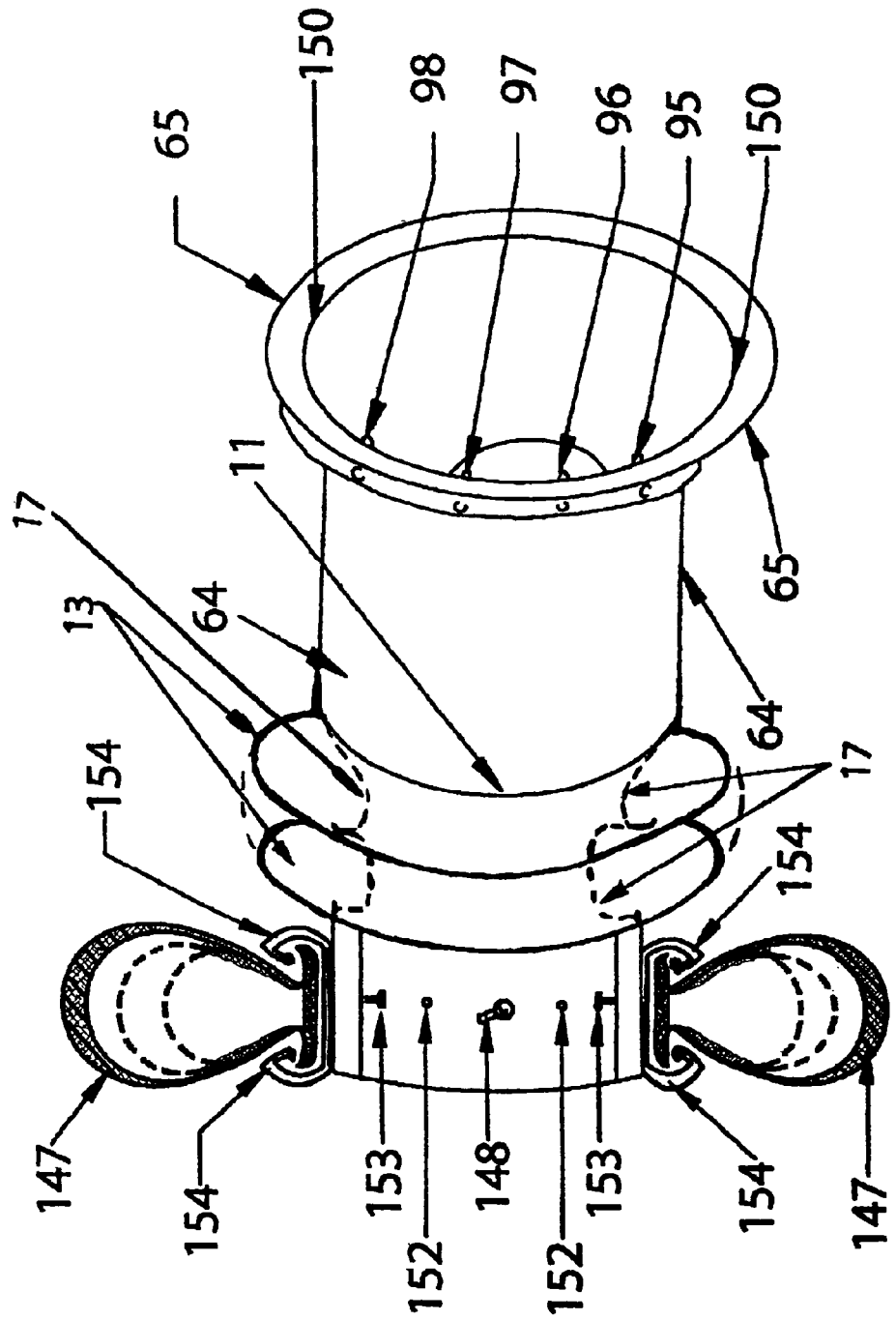
FIG. 24 is a perspective view of a yet further embodiment of the invention.

FIG. 24 is the wheel-rim system view having safety belt-flange 147 mounted upon rim 154, otherwise similar to the view shown in FIG. 22. FIG. 24 is showing the cross-sectional cutaway view of rim 154 shown otherwise in FIGS. 23 and 25. Rim 154 is mounted upon the rim-groove angle bearing hug-rim extension cylinder system which is extending wheel-rim cylinder 64 from circular line 11 in FIG. 24. Rim 154 is integrated to wheel-rim extension with screws 153. Screws 153 integrate rim 154 through aperture inlets 152 within the wheel-rim extension. The rim 154 is showing a hook-clamp shaped rim wall, otherwise showing a hook-clamp shaped groove with cross-section cutaway view within rim 154. The hook-clamp shaped groove within rim 154 prove effective for mounting and dismounting belt-flange 13 shown in FIG. 20 whether in solid form or in inflatable form. FIG. 24 showing the "omega" shaped cross spiraled flange-belt structure show in inner flange-belt 147 dotted line, regard general safety, approximate diameter range. Mounted safety interposed upon rim 154, and shown in safety correlated diameter range in inner flange-belt 147 dotted lines. The belted "omega" shaped flange-belt mounted upon rim 154 in FIG. 24 is shown mounted in the rim 154 hook-clamp shaped groove with cross-sectional cutaway view of rim 154.

Flange-belt 147 including within very high air pressure 100-300 psi analogous to the inflatable belt-flange 13 having the inflatable form shown and explained in FIGS. 1A, 19 and 20, the shown circumferential cross-sectional cutaway view of the "omega" shaped belt-flange 147 in FIG. 24 is mounted within the shown shape correlated rim groove in circumferential cross sectional cutaway view shown in rim 154. Rim 154 in FIG. 24 having a hook-clamp shaped groove and "omega" shaped belt-flange 147 of cross sectional cutaway view prove to withstand flat tire situations and very high side pressure including from the primary tire wall interfacing, double belt-flange 147 in FIG. 24 is in regard to the wheel-rim safety system 64 extra safety approach. Further an optional interchangeable safety method for the tire retaining double-belt-flange shown in FIG. 24 if slipping and flipping from the shown wheel-rim 64 double grooves 17, (shown in angled approximate dotted line of 45 degrees) after a flat tire situation or extreme road pressure.

The double-belt-flange in FIG. 24 is mounted superimposed within wheel-rim 64 in a diagonal angled in curve, double grooves 17. Shown in an angled curved, approximate diagonal dotted line of 45 degrees, relative to the wheel-rim surface, 64 in FIG. 24. The double-groove 17 is diagonal in curved from circumferential border line 11 within wheel-rim 64 in FIG. 24. The belt-flange structure 13 of structural variations; (for example "omega" shaped belt-flange 147 in FIG. 24) shown in FIGS. 20 and 24 mounted on wheel-rim 64 and upon rim 154 in FIG. 24 is inflatable from valve 148 up to approximately 100 to 300 psi or according to requirements. In regard to the safety wheel-rim system 64 modeling shown in FIG. 24. Further, also in reference to the interchangeable groove system variations upon wheel-rim 64.

FIG. 26 is the wheel-rim system interchangeable groove angles schematic perspective partial cross sectional cutaway view showing the angled hook-clamp shaped groove in a mark dotted line of 45 degrees, relative to the wheel-rim surface within wheel-rim system 64, otherwise similar to the view shown and explained in FIG. 24. The wheel-rim system in FIG. 26 is showing distinguished hook-clamp shaped rim groove system mounted upon wheel-rim extension 151 in FIG. 26.

The shown diagonal, approximate in mark dotted line, circumferential primary, hook-clamp shaped groove 17, of wheel-rim in curved approximate 45 degrees includes several smaller shallow grooves shown in an approximate mark dotted line, of a circumferential hook-clamp shaped shallow grooves within the groove 17 diagonal in curved approximate of 45 degrees circumferential in curved surface. For the better stability of the belt-flange structure 13 which is matched mounted upon circumferential groove 17. The circumferential hook-clamp shaped groove, within the wheel-rim 64 of polar wise rim 154 in FIG. 26 is to further safeguard the wheel with the said of a polar wise rim 154 which is to include suitable belt-flange structure 147 shown in FIG. 24. The reference wheel-rim system 64 including belt-flange 147 is shown in FIG. 24. Otherwise in regard to safety wheel-rim system 64 proper practical modeling shown in FIGS. 24 and 26 in reference to FIG. 27. FIG. 27 shows a corresponding primary tire 157 mounted upon wheel-rim system 64. The tire 157 is retained by belt-flange 13 which is mounted on hook-clamp shaped circumferential wheel-rim groove 17 shown in dotted line, about diagonal in curved approximate of 45 degrees. Wheel system 64 further showing "omega" shaped safety belt-flange 147 mounted upon the hook-clamp shaped groove within circumferential rim 154. The circumferential "omega" shaped belt flange 147, is the structure analogous to the circumferential belt-flange 13 shown in FIG. 20, which has a circumferential "omega" shape. Belt-flange 13 embodiment has grooves having suitably modified diameters shapes and sizes, according to the grooves diameters shape and size. The interchangeable rims-groove system variety mounted within the wheel-rim system 64 is supposed to have in general, equal external groove surface diameters, to the external surface diameter of said wheel-rim system 64. For fast mounting and demounting of the tire and the primary tire retaining belt-flange 13 upon the wheel-rim system 64 in circumferential groove 17 about diagonal in curved approximate of 45 degrees. FIG. 27 practical modeling approach offers a number of further options to make safety customizing incredibly practical, mostly for achieving the final product approaches. For example the primary tire 157 connected integrally to the primary belt-flange 13 in their parallel interfacing circumference on the wheel-rim 64 external surface. In other words, described, the tire 157 wall external side, which is pressurizing the tire retaining groove 17 superimposed belt-flange 13, in the belt-flange 13 groove superimposed external wall side, are connected integrally in the circumferential parallel interfacing area.

The tire 157 "beads" combining belt-flange 13 further structure-wise extending tire integral "beads" with belt-flange 13. Otherwise, for describing the options practically further forming, extending, replacing, or substituting integrally within the tire system the tire "beads." For mounting and dismounting the complete flange-belt 13 integral tire organization on the suitable circumferential hook-clamp shaped groove 17 within the shown wheel-rim system 64 in FIG. 27.

Accordingly while there has been shown and described the preferred embodiment of the present invention. It is to be appreciated, that the invention may be embodied otherwise than is herein specifically shown and described and that, within said embodiments certain changes may be made in the size, proportions, form and in the arrangement of the parts without departing from the underlying idea or principles of this invention within the scope of the Claims appended herewith.

I claim:

1. A system for self-repair of a tire, comprising:
   (a) a tire having a plurality of discreet compartments, said tire including a circumferentially extending tread surface;
   (b) a wheel including a rim having means for inflating at least one of said tire compartments located at one integral rim flange, the rim further including an inflatable and detachable rim flange opposite said integral rim flange, said inflatable and detachable rim flange circumferentially interfacing with a sidewall of the tire to allow mounting and demounting of the tire from the wheel; wherein said inflatable and detachable rim flange has an inflation pressure up to 4 times higher than the inflation pressure of said at least one tire compartment; and
   (c) a plurality of resilient mesh reinforced bead-like structures positioned and randomly floating within said tire compartments, said bead-like structures containing a polymeric pressure-sensitive tire sealant, which is activated by any rapid change in air pressure caused by a ruptured tire; said bead-like structures further including membrane partitions therein, said partitions formed of at least one flexible pressure-sensitive immiscible surface, said partitions containing a mix of metal and rubber particles therein, said partitions further including a quantity of free-floating adhesive materials, wherein in the event of a tire rupture, the bead-like structures serve to seal said rupture.

2. The system as recited in claim 1, further including a plurality of inflatable ball-like structures filled with a pressure sensitive glue, wherein the ball-like structures include at least one flexible pressure sensitive surface of immiscible material, and further include membrane partitions that incorporate a mix of meshed metal and rubber particles, which flatten against said rupture due to pressure, said partitions further encompass an egg-shaped polymeric mesh material that encapsulates said mix of meshed metal and rubber particles.

3. The system as recited in claim 1, further comprising:
   (a) at least one rim groove having a series of ridges for retaining said tire, wherein said tire includes a plurality of partition flanges defining said at least one tire compartment; and
   (b) said inflatable and detachable rim flange being inflatable to an air pressure up to 300 psi.

4. The system as recited in claim 3, wherein:
   (a) said at least one rim groove may include an additional groove to retain said detachable rim flange therein; and
   (b) said inflatable and detachable rim flange can function as an emergency tire during pressure loss in said tire, and has an outer diameter larger than that of said integral rim flange.

5. The system as recited in claim 4, wherein:
   (a) said tire partition flanges are formed from a combination of rubber and at least one of the following materials: steel, polyester, rayon, nylon, rubber, or plastics; and
   (b) said tire partition flanges may further include circumferentially extending, cross spiraled, reinforcing members.

6. The system as recited in claim 4, wherein:
   (a) said additional groove is a double groove, and said inflatable and detachable rim flange is a double rim flange; and
   (b) said double rim flange can function as an emergency tire during pressure loss in said tire.

7. The system as recited in claim 6, wherein said double groove is arranged at a forty-five degree angle with respect to the circumferential direction of the wheel rim.

* * * * *